(12) United States Patent
Shrivastava

(10) Patent No.: US 12,739,719 B2
(45) Date of Patent: Sep. 15, 2026

(54) COORDINATED SWITCHING GAP OPERATIONS BY UE COMPRISING PLURALITY OF SIMS IN WIRELESS NETWORK

(71) Applicant: Samsung Electronics Co., Ltd., Suwon-si (KR)

(72) Inventor: Vinay Kumar Shrivastava, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 397 days.

(21) Appl. No.: 18/272,241

(22) PCT Filed: Jan. 7, 2022

(86) PCT No.: PCT/KR2022/000287
§ 371 (c)(1),
(2) Date: Jul. 13, 2023

(87) PCT Pub. No.: WO2022/154384
PCT Pub. Date: Jul. 21, 2022

(65) Prior Publication Data

US 2024/0073765 A1 Feb. 29, 2024

(30) Foreign Application Priority Data

Jan. 13, 2021 (IN) ............................. 202141001706
Dec. 15, 2021 (IN) ............................. 2021 41001706

(51) Int. Cl.
*H04W 36/14* (2009.01)
*H04W 36/00* (2009.01)
(Continued)

(52) U.S. Cl.
CPC ....... *H04W 36/14* (2013.01); *H04W 36/0072* (2013.01); *H04W 76/27* (2018.02); *H04W 88/06* (2013.01)

(58) Field of Classification Search
CPC . H04W 36/14; H04W 36/0072; H04W 76/27; H04W 88/06; H04W 36/0088;
(Continued)

(56) References Cited

U.S. PATENT DOCUMENTS 9,215,753 B2 12/2015 Josso et al.
9,554,413 B2 1/2017 Burra et al.
(Continued)

FOREIGN PATENT DOCUMENTS

CN 112087794 A 12/2020
EP 3525531 A1 8/2019
(Continued)

OTHER PUBLICATIONS

Sony: "Solution for KI#3: Receiving Paging Occasions in other Networks", 3GPP Draft; S2-1911145, 3RD Generation Partnership Project (3GPP), vol. SA WG2, Nov. 8, 2019 (Year: 2019).*
(Continued)

*Primary Examiner* — Yuwen Pan
*Assistant Examiner* — Swati Jain
(74) *Attorney, Agent, or Firm* — Jefferson IP Law, LLP

(57) ABSTRACT

Embodiments herein provide a method for coordinated switching gap operations by a UE (100) comprising a plurality of SIMs (150) in a wireless network (1000). The method includes detecting that at least one of a BSR triggering, grant for uplink transmission, and measurement report and CSI reporting time for a first network operator apparatus (**200*a***) lies in between one of the switching gap start and stop time, a switching gap duration, and a number of repetitions of the switching gap. In an embodiment, the
(Continued)

method includes preventing a triggering of the BSR to the first network operator apparatus (200*a*). In another embodiment, the method includes reporting a new BSR report to the first network operator apparatus (200*a*) to indicate no buffered data. In another embodiment, the method includes abandoning or discarding at least one of the measurement report or the CSI reporting from the UE (100).

16 Claims, 14 Drawing Sheets

(51) Int. Cl.
*H04W 76/27* (2018.01)
*H04W 88/06* (2009.01)

(58) Field of Classification Search
CPC H04W 28/0278; H04W 8/183; H04W 60/005
See application file for complete search history.

(56) References Cited

U.S. PATENT DOCUMENTS

2013/0122918 A1* 5/2013 Boley .................. H04W 76/27 455/450
2014/0106747 A1* 4/2014 Josso .................. H04W 68/00 455/435.2
2014/0220981 A1* 8/2014 Jheng .................. H04W 76/15 455/437
2016/0119840 A1* 4/2016 Loehr .................. H04L 1/1822 370/331
2016/0234876 A1* 8/2016 Burra ................ H04W 36/0066
2016/0249408 A1* 8/2016 Thiruvenkatachari ...................... H04W 76/38
2019/0014548 A1 1/2019 Pelletier et al.
2019/0053324 A1* 2/2019 Tseng .................. H04W 76/30
2019/0150176 A1* 5/2019 Pelletier .............. H04W 72/566 370/329
2019/0223097 A1* 7/2019 Yi ..................... H04W 52/0216
2022/0109546 A1* 4/2022 Panteleev ............. H04L 5/0053
2022/0191778 A1* 6/2022 Kumar .................. H04W 48/18
2023/0388204 A1* 11/2023 Ramachandra ......... H04L 43/04
2023/0389119 A1* 11/2023 Araujo .................. H04W 76/15
2024/0292349 A1* 8/2024 Pelletier ................ H04W 76/27
2024/0365235 A1* 10/2024 Buckley .............. H04W 68/005
2024/0414775 A1* 12/2024 Chen ................. H04W 28/0263

FOREIGN PATENT DOCUMENTS

KR 10-1911853 B1 10/2018
WO 2020-146893 A1 7/2020
WO 2020-209641 A 10/2020

OTHER PUBLICATIONS

Sony: "Solution for KI#3: Receiving Paging Occasions in other Networks", 3GPP Draft; S2-1911145, 3rd Generation Partnership Project (3GPP), vol. SA WG2, Nov. 8, 2019 (Year: 2019) (Year: 2019).*

Sony, Solution for KI#3: Receiving Paging Occasions in other Networks, 3GPP Draft, S2-1911145, SA WG2 Meeting #136, Nov. 8, 2019, XP051821247.

Samsung, Discussion on switching mechanism for multi-SIM, 3GPP Draft, R2-2010350, 3GPP TSG-RAN WG2 Meeting #112-e, Oct. 23, 2020, XP052363388.

Extended European Search Report dated May 3, 2024, issue in European Patent Application No. 22739582.9.

Vivo, E-mail discussion: [Post111-e][917][Multi-SIM] Multi-Sim (vivo), 3GPP TSGRAN WG2 Meeting #112e, R2-2009325, Online, Oct. 23, 2020.

Indian Office Action dated Aug. 2, 2022, issued in an Indian Patent Application No. 202141001706.

* cited by examiner

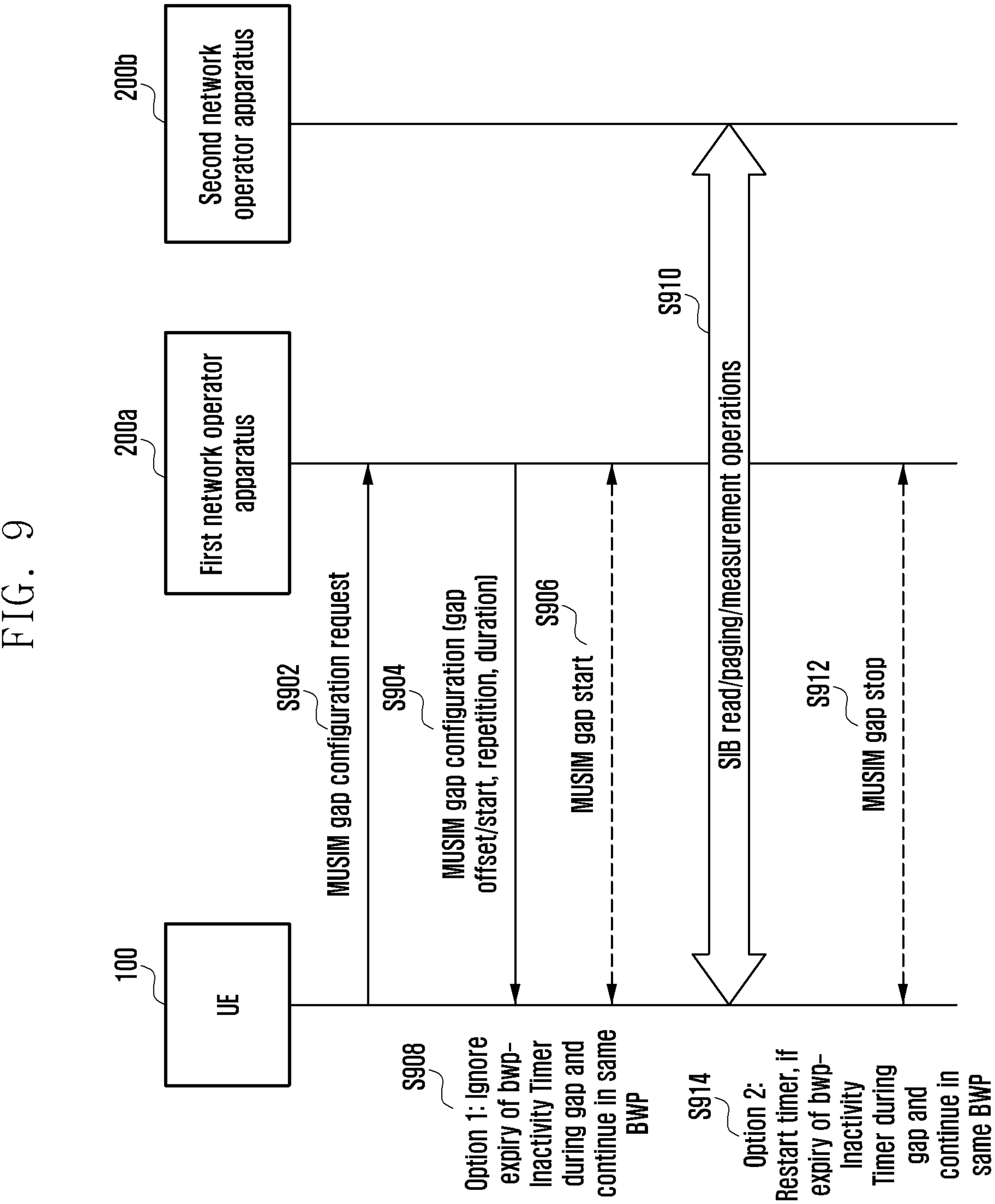
FIG. 9
100
UE
200a
First network operator apparatus
200b
Second network operator apparatus
S902
MUSIM gap configuration request
S904
MUSIM gap configuration (gap offset/start, repetition, duration)
S906
MUSIM gap start
S908
Option 1: Ignore expiry of bwp-Inactivity Timer during gap and continue in same BWP
S910
SIB read/paging/measurement operations
S912
MUSIM gap stop
S914
Option 2: Restart timer, if expiry of bwp-Inactivity Timer during gap and continue in same BWP

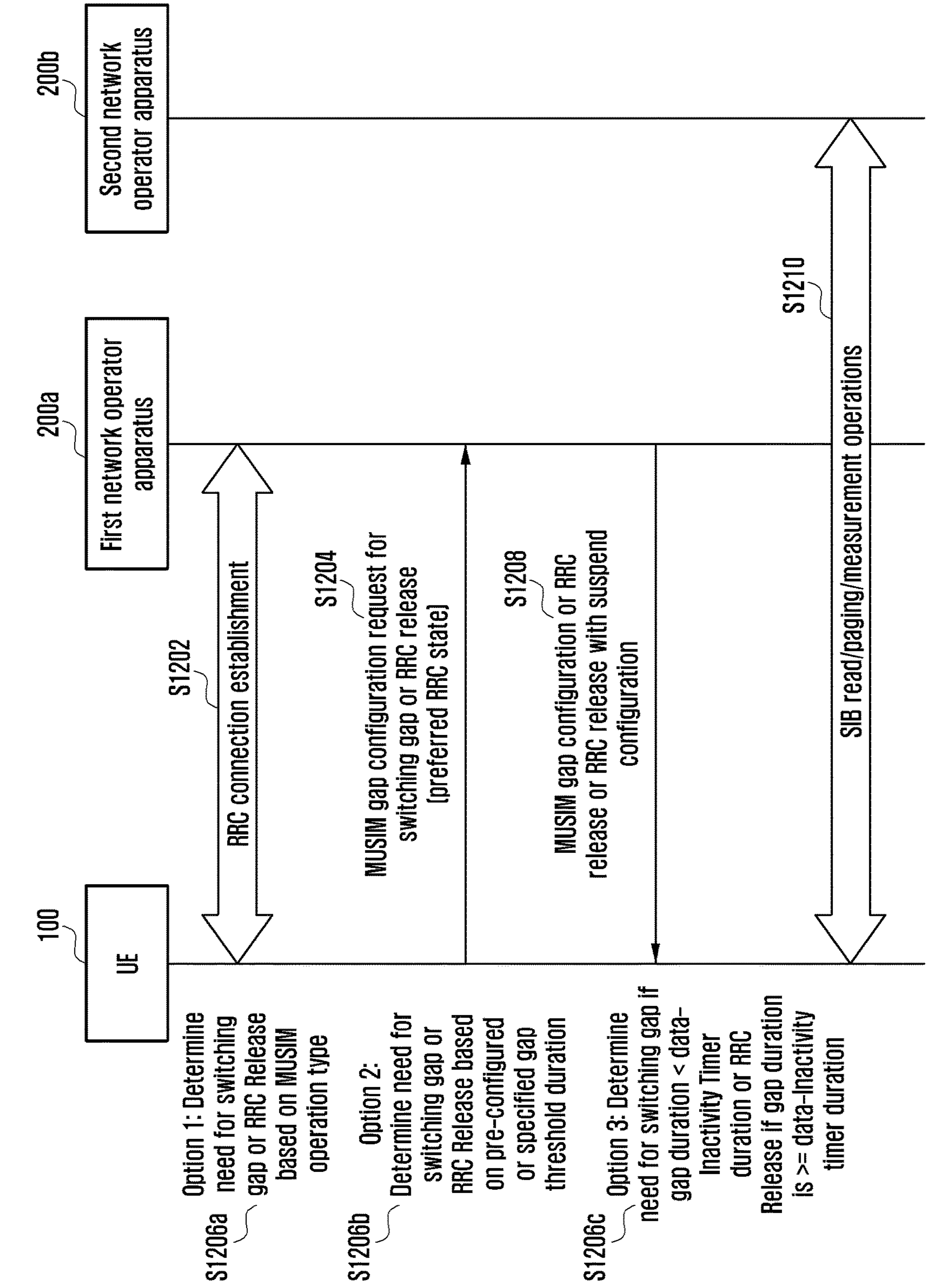
FIG. 12
100
UE
200a
First network operator apparatus
200b
Second network operator apparatus
S1202
RRC connection establishment
S1204
MUSIM gap configuration request for switching gap or RRC release (preferred RRC state)
S1208
MUSIM gap configuration or RRC release or RRC release with suspend configuration
S1210
SIB read/paging/measurement operations
S1206a
Option 1: Determine need for switching gap or RRC Release based on MUSIM operation type
S1206b
Option 2: Determine need for switching gap or RRC Release based on pre-configured or specified gap threshold duration
S1206c
Option 3: Determine need for switching gap if gap duration < data-Inactivity Timer duration or RRC Release if gap duration is >= data-Inactivity timer duration

Figure 13:
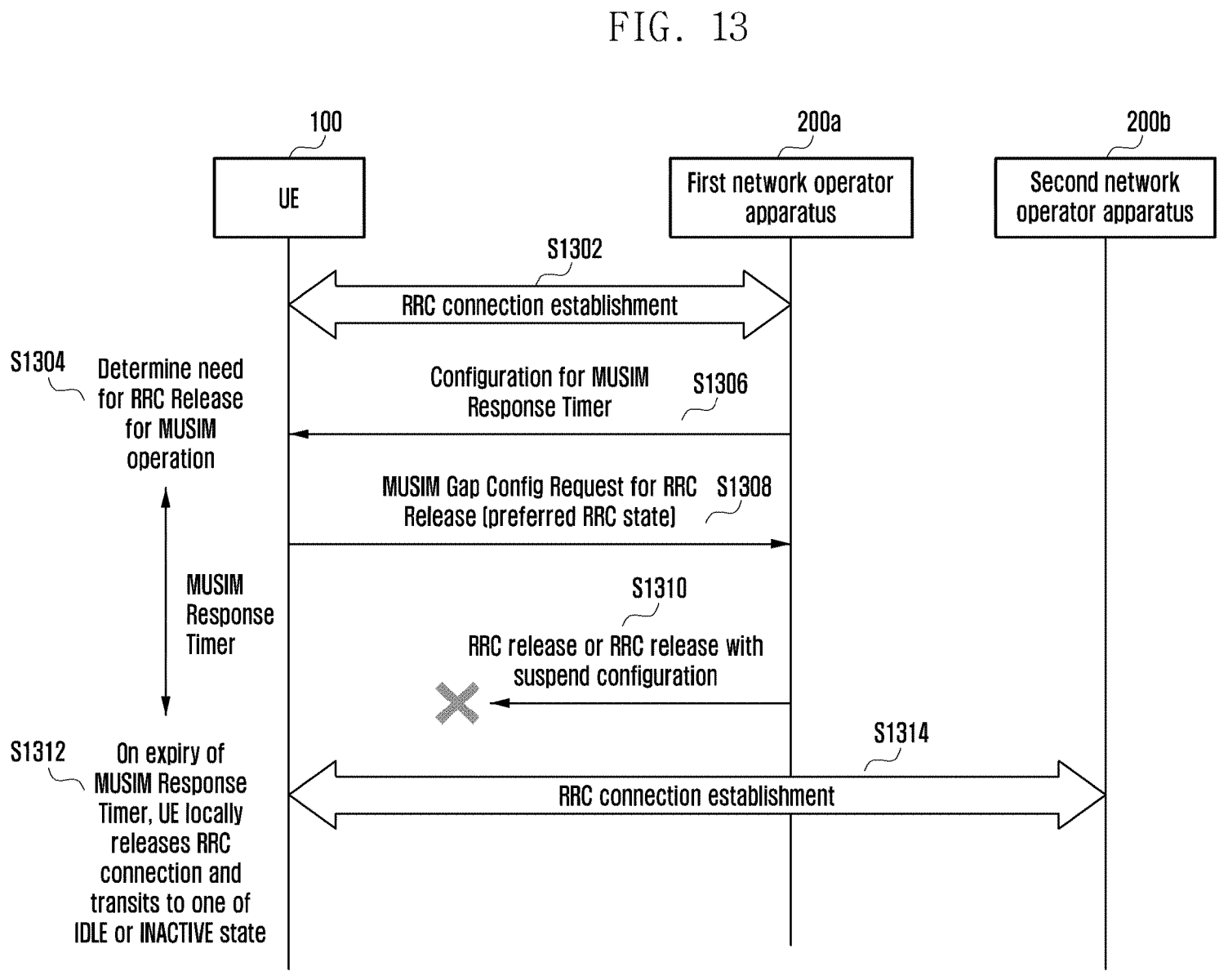

200a First network operator apparatus

200b Second network operator apparatus

S1302 RRC connection establishment

S1304 Determine need for RRC Release for MUSIM operation

S1306 Configuration for MUSIM Response Timer

S1308 MUSIM Gap Config Request for RRC Release [preferred RRC state]

MUSIM Response Timer

S1310 RRC release or RRC release with suspend configuration

S1312 On expiry of MUSIM Response Timer, UE locally releases RRC connection and transits to one of IDLE or INACTIVE state S1314 RRC connection establishment

FIG. 14

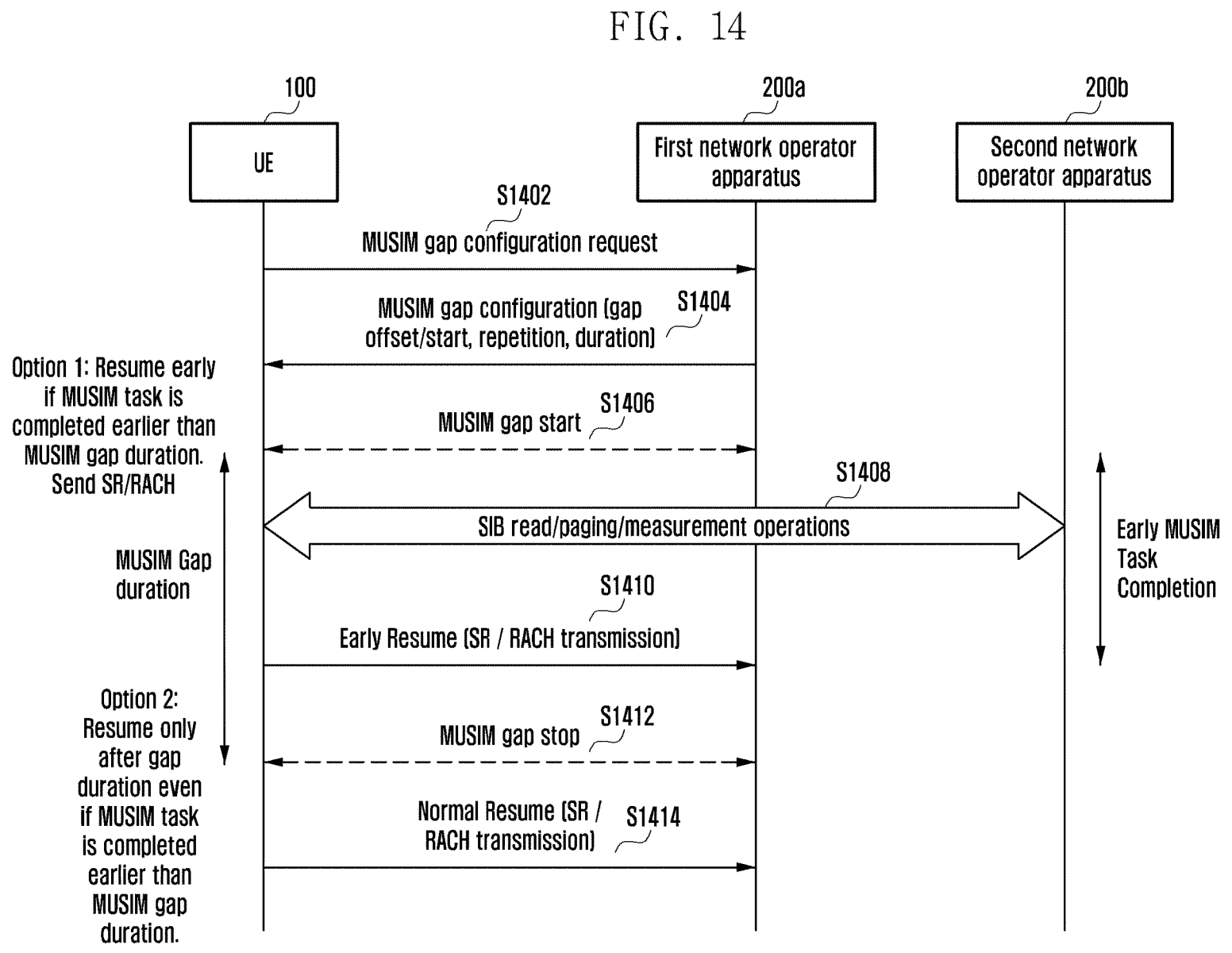

UE
100
First network operator apparatus
200a
Second network operator apparatus
200b
S1402
MUSIM gap configuration request
S1404
MUSIM gap configuration (gap offset/start, repetition, duration)
S1406
MUSIM gap start
S1408
SIB read/paging/measurement operations
Early MUSIM Task Completion
S1410
Early Resume (SR / RACH transmission)
S1412
MUSIM gap stop
S1414
Normal Resume (SR / RACH transmission)
Option 1: Resume early if MUSIM task is completed earlier than MUSIM gap duration. Send SR/RACH
MUSIM Gap duration
Option 2: Resume only after gap duration even if MUSIM task is completed earlier than MUSIM gap duration.

COORDINATED SWITCHING GAP OPERATIONS BY UE COMPRISING PLURALITY OF SIMS IN WIRELESS NETWORK

CROSS-REFERENCE TO RELATED APPLICATION(S)

This application is a U.S. National Stage application under 35 U.S.C. § 371 of an International application number PCT/KR2022/000287, filed on Jan. 7, 2022, which is based on and claimed priority of an Indian Provisional Application number 202141001706, filed on Jan. 13, 2021, in the Indian Intellectual Property Office, and of an Indian Non-Provisional Application number 202141001706, filed on Dec. 15, 2021, in the Indian Intellectual Property Office the disclosure of each of which is incorporated by reference herein in its entirety.

TECHNICAL FIELD

The present disclosure relates to a wireless network, and more specifically related to a method and a Multiple Subscriber Identity Module User Equipment (Multi-SIM UE) for coordinated switching gap operations in a 5$^{th}$ Generation (5G) network.

BACKGROUND ART

To meet the increasing demand for wireless data traffic since the deployment of a 4th generation (4G) communication systems, efforts have been made to develop an improved 5th generation (5G) or pre-5G communication system. Therefore, the 5G or pre-5G communication system is also called a "beyond 4G network" communication system or a "post long term evolution (LTE) System."

Implementation of the 5G communication system in ultrahigh frequency (mmWave) bands, such as, for example, 60 GHz bands, is being considered in order to accomplish higher data rates. To mitigate a path loss of the radio waves and increase the transmission distance on the radio waves in the ultrahigh frequency bands, beamforming, massive multiple-input multiple-output (massive MIMO), full dimensional MIMO (FD-MIMO), array antenna, analog beamforming, and large scale antenna techniques are being discussed for 5G communication systems.

In addition, in 5G communication systems, development for system network improvement is under way based on evolved small cells, advanced small cells, cloud radio access networks (cloud RANs), ultra-dense networks, device-to-device (D2D) communication, wireless backhaul, moving network, cooperative communication, coordinated multi-points (CoMP), reception-end interference cancellation, and the like.

In addition, in the 5G system, hybrid FSK and QAM modulation (FQAM) and sliding window superposition coding (SWSC), as advanced coding modulation (ACM) systems, and filter bank multicarrier (FBMC), non-orthogonal multiple access (NOMA), and sparse code multiple access (SCMA), as advanced access technologies, have been developed.

In the 5G system, it has been considered to support various services in comparison with the existing 4G system. For example, the most representative services may be enhanced mobile broadband (eMBB), ultra-reliable low-latency communication (URLLC), massive machine type communication (mMTC), evolved multimedia broadcast/multicast service, and the like. Further, a system providing the URLLC service may be called a URLLC system, and a system providing the eMBB service may be called an eMBB system. Further, the terms "service" and "system" may be interchangeably used.

Among them, the URLLC service is a service that is newly considered in the 5G system in contrast with the existing 4G system, and it should satisfy ultra-high reliability (e.g., packet error rate of about $10^{-5}$) and low latency (e.g., about 0.5 msec) requirements in comparison with other services. In order to satisfy such severe requirements, the URLLC service may require an application of a transmit time interval (TTI) that is shorter than that of the eMBB service, and various operating schemes using this are under consideration.

On the other hand, the Internet, which is a human-centered connectivity network where humans generate and consume information, is now evolving to the Internet of things (IoT) where distributed entities, such as things, exchange and process information without human intervention. The Internet of everything (IoE), which is a combination of IoT technology and big data processing technology through connection with a cloud server, has emerged. Technology elements, such as sensing technology, wired/wireless communication and network infrastructure, service interface technology, and "security technology," have been demanded for IoT implementation, and thus technologies, such as a sensor network, machine-to-machine (M2M) communication, machine type communication (MTC) for a connection between things, have recently been researched.

An IoT environment may provide intelligent Internet technology (IT) services that create a new value for human life by collecting and analyzing data generated among connected things. IoT may be applied in a variety of contexts, including smart homes, smart buildings, smart cities, smart cars or connected cars, smart grids, health care, smart appliances, and advanced medical services, through convergence and combination between existing information technology (IT) and various industrial applications.

Accordingly, various attempts have been made to apply the 5G communication system to IoT networks. For example, technologies of sensor network, machine to machine (M2M) communication, and machine type communication (MTC) have been implemented by techniques for beamforming, MIMO, and array antennas, which correspond to the 5G communication technology. As the big data processing technology as described above, application of a cloud radio access network (cloud RAN) would be an example of convergence between the 5G technology and the IoT technology.

DISCLOSURE OF INVENTION

Technical Problem

The principal object of the embodiments herein is to provide a method and Multi-SIM UE for coordinated switching gap operations in a 5G network.

The proposed method can be used to handle short time switching gap and long term switching gap operations for the MUSIM UE. The proposed method can be used to provide a coordinated approach between the UE and the network apparatus that would enable efficient and robust operation, and saving of scheduling resources for both UE and networks.

The technical solutions provided by certain embodiments according to this by the disclosure are not limited to the aforementioned functionalities, and further technical solutions and additional embodiments could be clearly understood by those of ordinary skill in the art to which this disclosure pertains.

Solution to Problem

Accordingly, the embodiment herein is to provide a method for coordinated switching gap operations by a user equipment (UE) comprising a plurality of SIMs in a wireless network. The method includes sending, by the UE, a switching gap configuration request to a first network operator apparatus associated with a first SIM of the plurality of SIMs of the UE. Further, the method includes receiving, by the UE, at least one switching gap configuration from the first network operator apparatus. The switching gap configuration includes at least one of a switching gap start and stop time, switching gap duration, and a number of repetitions of the switching gap. Further, the method includes detecting, by the UE, that at least one of a buffer status report (BSR) triggering, grant for uplink transmission, and measurement report and Channel State Information (CSI) reporting time for the first network operator apparatus lies in between one of the switching gap start and stop time, the switching gap duration, and the number of repetitions of the switching gap. In an embodiment, the method includes preventing the triggering of the BSR to the first network operator apparatus. In another embodiment, the method includes reporting a new BSR report to the first network operator apparatus to indicate no buffered data. In another embodiment, the method includes processing the grant for which the corresponding uplink transmission is pursued before start of the switching gap and discarding the grants for which the uplink transmission falls in the between the switching gap. In another embodiment, the method includes abandoning or discarding at least one of the measurement report or the CSI reporting from the UE.

In an embodiment, the method includes detecting, by the UE, a switch condition based on at least one of a MUSIM operation type, a switching gap duration meeting a switching gap threshold duration, and the switching gap duration is greater than a duration of a data inactivity timer. Further, the method includes switching, by the UE, from the first SIM to the second SIM. Further, the method includes performing, by the UE, at least one MUSIM operation with a second network operator apparatus associated with the second SIM based on the at least one switching gap configuration or performing, by the UE, at least one MUSIM operation with a second network operator apparatus associated with the second SIM based on the RRC release with the first network and establishing RRC connection with the second network.

In an embodiment, further, the method includes detecting, by the UE, a start of the switching gap. Further, the method includes detecting, by the UE, whether the at least one MUSIM operation is completed earlier than the switching gap duration. In an embodiment, further, the method includes transmitting one of Scheduling Request (SR) and Random-access channel (RACH) Request to the first network operator apparatus upon completion of the at least one MUSIM operation earlier than the switching gap duration. In another embodiment, further, the method includes detecting that the switching gap duration is completed upon completion of the at least one MUSIM operation earlier than the switching gap duration, and transmitting one of SR and RACH Request to the first network operator apparatus upon completion of the switching gap duration In an embodiment, further, the method includes detecting, by the UE, start of the switching gap. Further, the method includes detecting, by the UE, stop of the switching gap. In an embodiment, further, the method includes triggering the BSR report to the first network operator apparatus after the switching gap is stopped. In another embodiment, further, the method includes reusing previous measurement and CSI feedback after the switching gap is stopped and reporting the previous measurement and CSI feedback to the first network operator apparatus. In another embodiment, further, the method includes reusing previous measurement and CSI feedback and performing new measurement and CSI feedback after the switching gap is stopped, combining previous measurement and CSI feedback, and new measurement and CSI feedback, and reporting the combined previous measurement and CSI feedback and new measurement and CSI feedback to the first network operator apparatus. In another embodiment, further, the method includes performing new measurement and CSI feedback after the switching gap is stopped and reporting the new measurement and CSI feedback to the first network operator apparatus.

In an embodiment, further, the method includes detecting, by the UE, a presence of at least one of a buffer status at the UE and grants for uplink transmission at UE. Further, the method includes sending, by the UE, a request for the switching gap based on the presence of at least one of the buffer status and the grants. Further, the method includes reporting, by the UE, a MAC buffer status by considering PDCP and RLC data volume to be 0 to the first network operator apparatus.

In an embodiment, further, the method includes detecting, by the UE, start of the switching gap and stopping, by the UE, the data inactivity timer in response to detecting the start of the switching gap. Further, the method includes detecting, by the UE, stop of the switching gap and starting or restarting, by the UE, the data inactivity timer in response to detecting the switching gap is stopped.

In an embodiment, further, the method includes detecting, by the UE, whether the data inactivity timer is expired during the switching gap. Further, the method includes continuing, by the UE, in a RRC connected state by ignoring the expiry of the data inactivity timer during switching gap or restarting the data inactivity timer during the switching gap.

In an embodiment, further, the method includes detecting, by the UE, start of the switching gap. Further, the method includes stopping, by the UE, a bandwidth part (bwp)-Inactivity timer in response to detecting the start of the switching gap. Further, the method includes detecting, by the UE, stop of the switching gap and starting or restarting, by the UE, the bwp-Inactivity timer in response to detecting the switching gap is stopped.

In an embodiment, the method includes detecting, by the UE, whether the bwp-Inactivity timer is expired during the switching gap and continuing, by the UE, in a RRC connected state by ignoring the expiry of the bwp-Inactivity timer during the switching gap or restarting the bwp-Inactivity timer during the switching gap.

In an embodiment, the method includes determining, by the UE, whether one of the duration of the switching gap is greater than or equal to a discard timer, and the duration of the switching gap is greater than or equal to a t-reordering timer. In an embodiment, the method includes clearing at least one of UL and DL HARQ buffers in response to determining one of the duration of the switching gap is greater than or equal to the discard timer, and the duration of the switching gap is greater than or equal to the t-reordering timer, wherein the UL and DL buffers are cleared at the start of the switching gap. In another embodiment, the method includes stopping at least one DRX timer in response to determining one of the duration of the switching gap is greater than or equal to the discard timer, and the duration of the switching gap is greater than or equal to the t-reordering timer, wherein the UL and DL buffers are cleared at the start of the switching gap. In another embodiment, the method includes maintaining at least one of UL and DL HARQ buffers in response to determining one of the duration of the switching gap is not greater than or equal to the discard timer, and the duration of the switching gap is not greater than or equal to the t-reordering timer, wherein the UL and DL buffers are maintained during the switching gap. In another embodiment, the method includes maintaining at least one DRX timer in response to determining one of the duration of the switching gap is not greater than or equal to the discard timer, and the duration of the switching gap is not greater than or equal to the t-reordering timer, wherein the UL and DL buffers are maintained during the switching gap.

In an embodiment, the method includes clearing at least one of UL and DL HARQ buffers at the start of the switching gap or stopping at least one DRX timer at the start of the switching gap or maintaining at least one of UL and DL HARQ buffers at the start of the switching gap, or maintaining at least one DRX timer at the start of the switching gap In an embodiment, the method includes establishing, by the UE, an RRC connection with the first SIM of the plurality of SIMs. Further, the method includes receiving, by the UE, a configuration of a MUSIM timer from a first network operator apparatus associated with the first SIM. Further, the method includes sending, by the UE, at least one switching gap configuration request for at least one switching gap or releasing the RRC connection with the first SIM to the first network operator apparatus. Further, the method includes starting, by the UE, the MUSIM timer after sending the RRC connection release request. Further, the method includes detecting, by the UE, that the MUSIM timer is expired before receiving a RRC release message from the first network operator apparatus. Further, the method includes releasing, by the UE, the RRC connection locally at the UE. Further, the method includes transiting, by the UE, to one of an idle state and inactive state. Further, the method includes establishing, by the UE, a RRC connection with a second network operator apparatus associated with a second SIM of the plurality of SIMs.

Advantageous Effects of Invention

Accordingly, the embodiment herein is to provide a multi-SIM UE for coordinated switching gap operations in a wireless network. The multi-SIM UE includes a coordinated switching gap controller connected to a memory and a processor. The coordinated switching gap controller is configured to send at least one switching gap configuration request to a first network operator apparatus associated with a first SIM of the plurality of SIMs of the UE. Further, the coordinated switching gap controller is configured to receive at least one switching gap configuration from the first network operator apparatus. The at least one switching gap configuration includes at least one of a switching gap start and stop time, a switching gap duration, and a number of repetitions of the switching gap. Further, the coordinated switching gap controller is configured to detect that at least one of a buffer status report (BSR) triggering, grant for uplink transmission, and measurement report and Channel State Information (CSI) reporting time for the first network operator apparatus lies in between one of the switching gap start and stop time, the switching gap duration, and the number of repetitions of the switching gap. In an embodiment, the coordinated switching gap controller is configured to prevent the triggering of the BSR to the first network operator apparatus. In another embodiment, the coordinated switching gap controller is configured to report a new BSR report to the first network operator apparatus to indicate no buffered data. In another embodiment, the coordinated switching gap controller is configured to process the grant for which the corresponding uplink transmission is pursued before start of the switching gap and discarding the grants for which the uplink transmission falls in the between the switching gap. In another embodiment, the coordinated switching gap controller is configured to abandon or discard at least one of the measurement report or the CSI reporting from the UE.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the scope thereof, and the embodiments herein include all such modifications.

BRIEF DESCRIPTION OF DRAWINGS

This embodiment is illustrated in the accompanying drawings, throughout which like reference letters indicate corresponding parts in the various figures. The embodiments herein will be better understood from the following description with reference to the drawings, in which:

FIG. 9 is another sequence flow diagram illustrating the coordinated switching gap operations by the UE comprising the plurality of SIMs in the wireless network based on the bwp-Inactivity timer, according to an embodiment as disclosed herein;

FIG. 12 is a sequence flow diagram illustrating the coordinated switching gap operations by the UE upon the UE sending a MUSIM gap configuration request for switching gap or a RRC release to a first network apparatus, according to an embodiment as disclosed herein;

FIG. 13 is a sequence flow diagram illustrating the coordinated switching gap operations upon the UE receiving a configuration for a MUSIM response timer from the first network apparatus, according to an embodiment as disclosed herein; and FIG. 14 is a sequence flow diagram illustrating the coordinated switching gap operations by the UE for handling a SR/RACH transmission in the wireless network, according to an embodiment as disclosed herein.

MODE FOR THE INVENTION

Figure 1:
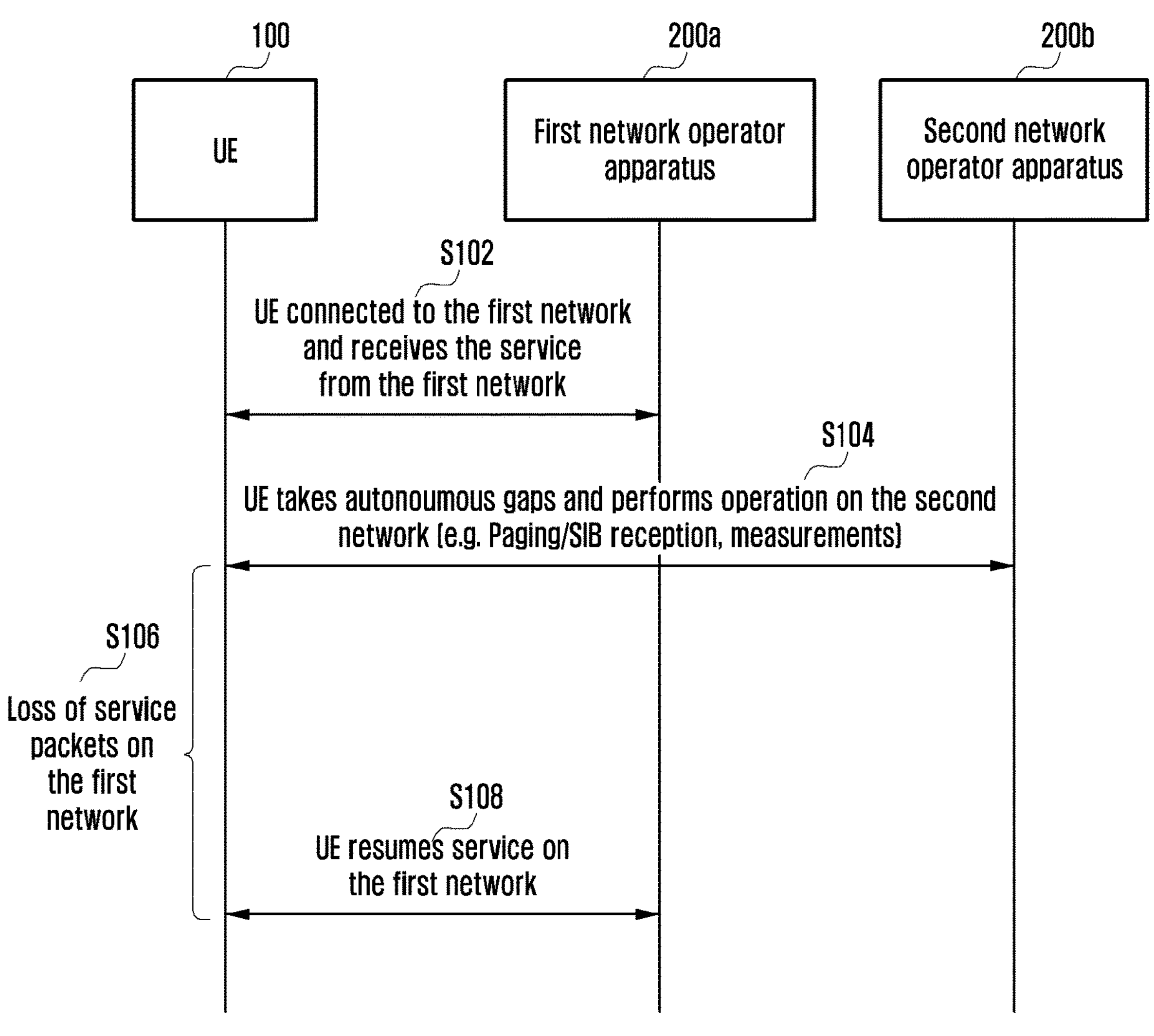
FIG. 1 illustrates an example sequence diagram of coordinated switching gap operations by a UE comprising a plurality of SIMs in a wireless network, according to the prior art.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

In general, due to popularity of a Multi-SIM (MUSIM) devices that host more than one SIM to have the facility to connect to two or more different networks in order to avail different data plans, have user profiles like home and office, increased connectivity/reliability with multiple connections etc. In order to save on the cost, a radio frequency (RF) circuitry used by the UE is common for multiple SIMs. That implies, multiple SIMs need to arbitrate and share the common RF resource among themselves to perform their activities and/or avail services. Effectively, only one SIM and its associated protocol stack can be served. Meanwhile, all other SIMs and their associated protocol stacks will be waiting for the RF resource to be available for them. One or more of the multiple SIMs can be engaged in paging reception, system information block (SIB) acquisition, measurement, data or voice call, Multimedia broadcast multicast service (MBMS), emergency call, access stratum (AS) signaling, Non-access stratum (NAS) signaling and so on. Some of these operations are periodic like paging and some are aperiodic and/or un-deterministic like signaling. Further, duration required to complete the operation may also be fixed or unpredictable.

In order to share the resources among multiple SIMs when multiple SIMs are engaged in different activities, there is a need for a method which creates "gaps" during the activities of one SIM and make RF resource avail to other SIM for the gap duration. Further, as mentioned due to activities across multiple SIMs have different priorities, periodicities or unpredictable occurrences, it becomes a challenging task. Without an efficient approach, the operation of MUSIM UE as well as network operation will be power- and resource-inefficient.

FIG. 1 illustrates a scenario of coordinated switching gap operations by a UE comprising a plurality of SIMs in a wireless network, according to the prior art. At S102, the UE (100) is connected to the first network (200*a*) and receives a service from the first network (200*a*). At S104, the UE (100) takes autonomous gaps and performs operation on the second network (200*b*). The operation can be, for example, but not limited to paging/SIB reception, measurements or the like. At S106, the UE (100) detects loss of service packets on the first network (200*a*). At 108, the UE (100) resumes service on the first network (200*a*).

Thus, it is desired to address the above mentioned disadvantages or other shortcomings or at least provide a useful alternative.

Accordingly the embodiment herein is to provide a method for coordinated switching gap operations by a user equipment (UE) comprising a plurality of SIMs in a wireless network. The method includes sending, by the UE, a switching gap configuration request to a first network operator apparatus associated with a first SIM of the plurality of SIMs of the UE. Further, the method includes receiving, by the UE, at least one switching gap configuration from the first network operator apparatus. The switching gap configuration includes at least one of a switching gap start and stop time, switching gap duration, and a number of repetitions of the switching gap. Further, the method includes detecting, by the UE, that at least one of a buffer status report (BSR) triggering, grant for uplink transmission, and measurement report and Channel State Information (CSI) reporting time for the first network operator apparatus lies in between one of the switching gap start and stop time, the switching gap duration, and the number of repetitions of the switching gap. In an embodiment, the method includes preventing the triggering of the BSR to the first network operator apparatus. In another embodiment, the method includes reporting a new BSR report to the first network operator apparatus to indicate no buffered data. In another embodiment, the method includes processing the grant for which the corresponding uplink transmission is pursued before start of the switching gap and discarding the grants for which the uplink transmission falls in the between the switching gap. In another embodiment, the method includes abandoning or discarding at least one of the measurement report or the CSI reporting from the UE.

The proposed method can be used to handle short time switching gap and long term switching gap operations for the MUSIM UE. The proposed method can be used to provide a coordinated approach between the UE and the network apparatus that would enable efficient and robust operation, and saving of scheduling resources for both UE and networks.

Referring now to the drawings and more particularly to FIGS. 2 through 14 where similar reference characters denote corresponding features consistently throughout the figures, there are shown preferred embodiments.

Figure 2:
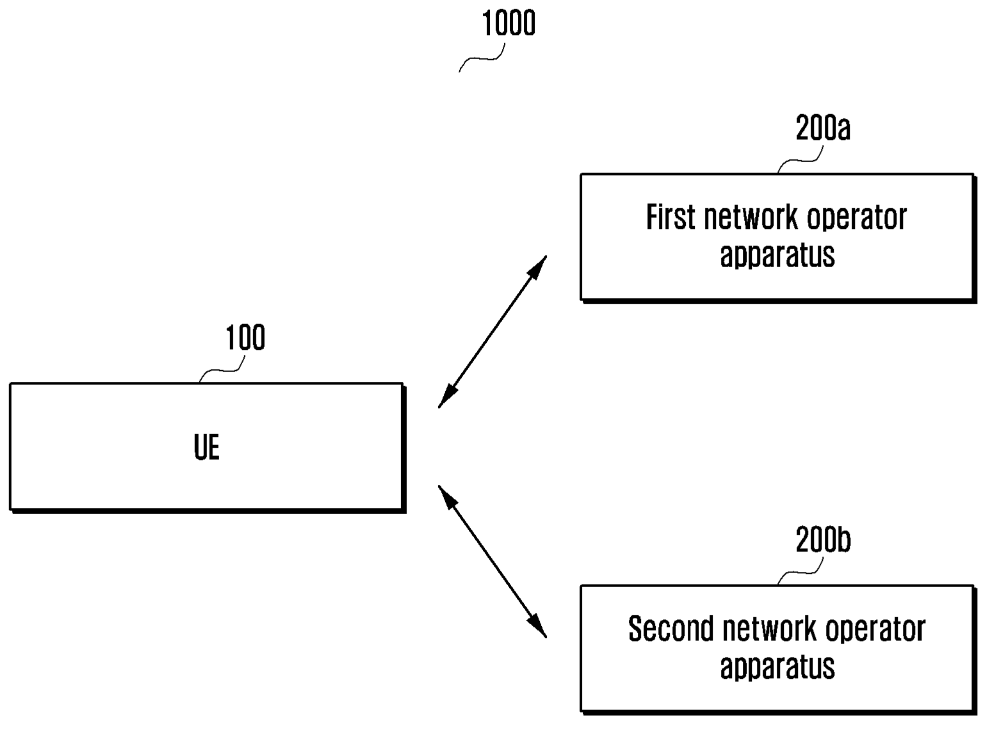
FIG. 2 is an overview of a wireless network for coordinated switching gap operations by the UE comprising the plurality of SIMs in the wireless network, according to an embodiment as disclosed herein.

FIG. 2 is an overview of a wireless network (1000) for coordinated switching gap operations by a UE (100) comprising a plurality of SIMs (150), according to an embodiment as disclosed herein. In an embodiment, the wireless network (1000) includes a UE (100), a first network operator apparatus (200*a*) and a second network operator apparatus (200*b*). The wireless network (1000) can be, for example, but not limited to a 5G network, a 6G network and an O-RAN network. The UE (100) can be, for example, but not limited to a laptop, a desktop computer, a notebook, a relay device, a Device-to-Device (D2D) device, a television, a vehicle to everything (V2X) device, a smartphone, a tablet, an immersive device, and an internet of things (IoT) device.

The UE (100) is configured to send a switching gap configuration request to the first network operator apparatus (200*a*) associated with a first SIM (150*a* (as shown in the FIG. 3)) of a plurality of SIMs (150 (as shown in the FIG. 3)). Based on the switching gap configuration request, the UE (100) is configured to receive a switching gap configuration from the first network operator apparatus (200*a*). The switching gap configuration includes a switching gap start and stop time, switching gap duration, and a number of repetitions of the switching gap. Further, the UE (100) is configured to detect that a BSR triggering, grant for uplink transmission, and measurement report and CSI reporting time for the first network operator apparatus (200*a*) lies in between one of the switching gap start and stop time, the switching gap duration, and the number of repetitions of the switching gap. In an embodiment, based on the detection, the UE (100) is configured to prevent the triggering of the BSR to the first network operator apparatus (200*a*). In another embodiment, based on the detection, the UE (100) is configured to report a new BSR report to the first network operator apparatus (200*a*) to indicate no buffered data. In another embodiment, based on the detection, the UE (100) is configured to process the grant for which the corresponding uplink transmission is pursued before start of the switching gap and discarding the grants for which the uplink transmission falls in the between the switching gap. In another embodiment, based on the detection, the UE (100) is configured to abandon or discarding the measurement report or the CSI reporting from the UE (100).

Further, the UE (100) is configured to detect a switch condition based on the MUSIM operation type, a switching gap duration meeting a switching gap threshold duration, and the switching gap duration is greater than a duration of a data inactivity timer. Further, the UE (100) is configured to switch from the first SIM (150*a*) to the second SIM (150*b* (as shown in the FIG. 3)). In an embodiment, the UE (100) is configured to perform the MUSIM operation with a second network operator apparatus (200*b*) associated with the second SIM (150*b*) based on the switching gap configuration. In another embodiment, the UE (100) is configured to perform the MUSIM operation with the second network operator apparatus (200*b*) associated with the second SIM (150*b*) based on the RRC release with the first network operator apparatus (200*a*) based on the detected switch condition and establish a RRC connection with the second network operator apparatus (200*b*).

Further, the UE (100) is configured to detect a start of the switching gap and detect whether the MUSIM operation is completed earlier than the switching gap duration. In an embodiment, based on the detection, the UE (100) is configured to transmit SR and RACH Request to the first network operator apparatus (200*a*) upon completion of the at least one MUSIM operation earlier than the switching gap duration. In another embodiment, based on the detection, the UE (100) is configured to detect that the switching gap duration is completed upon completion of the at least one MUSIM operation earlier than the switching gap duration, and transmit one of SR and RACH Request to the first network operator apparatus (200*a*) upon completion of the switching gap duration.

Further, the UE (100) is configured to detect start of the switching gap and detect stop of the switching gap. In an embodiment, based on the detection, the UE (100) is configured to trigger the BSR report to the first network operator apparatus (200*a*) after the switching gap is stopped. In another embodiment, based on the detection, the UE (100) is configured to reuse previous measurement and CSI feedback after the switching gap is stopped and reports the previous measurement and CSI feedback to the first network operator apparatus (200*a*). In another embodiment, based on the detection, the UE (100) is configured to reuse previous measurement and CSI feedback and performing new measurement and CSI feedback after the switching gap is stopped, combine previous measurement and CSI feedback, and new measurement and CSI feedback, and report the combined previous measurement and CSI feedback and new measurement and CSI feedback to the first network operator apparatus (200*a*). In another embodiment, based on the detection, the UE (100) is configured to perform new measurement and CSI feedback after the switching gap is stopped and reporting the new measurement and CSI feedback to the first network operator apparatus (200*a*).

Further, the UE (100) is configured to detect a presence of the buffer status at the UE (100) and grants for uplink transmission at UE (100) and send a request for the switching gap based on the presence of the buffer status and the grants. Further, the UE (100) is configured to report a MAC buffer status by considering PDCP and RLC data volume to be 0 to the first network operator apparatus (200*a*).

Further, the UE (100) is configured to detect start of the switching gap and stop the data inactivity timer in response to detecting the start of the switching gap. Further, the UE (100) is configured to detect stop of the switching gap, and start or restart the data inactivity timer in response to detecting the switching gap is stopped.

Further, the UE (100) is configured to detect whether the data inactivity timer is expired during the switching gap and continue the UE (100) in a RRC connected state by ignoring the expiry of the data inactivity timer during switching gap or restarting the data inactivity timer during the switching gap.

Further, the UE (100) is configured to detect start of the switching gap and stop a bandwidth part (bwp)-Inactivity timer in response to detecting the start of the switching gap. Further, the UE (100) is configured to detect stop of the switching gap and start or restart the bwp-Inactivity timer in response to detecting the switching gap is stopped.

Further, the UE (100) is configured to detect whether the bwp-Inactivity timer is expired during the switching gap and continue the UE (100) in a RRC connected state by ignoring the expiry of the bwp-Inactivity timer during the switching gap or restarting the bwp-Inactivity timer during the switching gap.

Further, the UE (100) is configured to determine whether one of the duration of the switching gap is greater than or equal to a discard timer, and the duration of the switching gap is greater than or equal to a t-reordering timer. In an embodiment, the UE (100) is configured to clear the UL and DL HARQ buffers in response to determining one of the duration of the switching gap is greater than or equal to the discard timer, and the duration of the switching gap is greater than or equal to the t-reordering timer, wherein the UL and DL buffers are cleared at the start of the switching gap. In another embodiment, the UE (100) is configured to stop at least one DRX timer in response to determining one of the duration of the switching gap is greater than or equal to the discard timer, and the duration of the switching gap is greater than or equal to the t-reordering timer, where the UL and DL buffers are cleared at the start of the switching gap. In another embodiment, the UE (100) is configured to maintain the UL and the DL HARQ buffers in response to determining one of the duration of the switching gap is not greater than or equal to the discard timer, and the duration of the switching gap is not greater than or equal to the t-reordering timer, wherein the UL and DL buffers are maintained during the switching gap. In an embodiment, the UE (100) is configured to maintain at least one DRX timer in response to determining one of the duration of the switching gap is not greater than or equal to the discard timer, and the duration of the switching gap is not greater than or equal to the t-reordering timer, wherein the UL and DL buffers are maintained during the switching gap.

Further, the UE (100) is configured to establish an RRC connection with the first SIM (150*a*) of the plurality of SIMs (150). Further, the UE (100) is configured to receive the configuration of the MUSIM timer from the first network operator apparatus (200*a*) associated with the first SIM (150*a*). Further, the UE (100) is configured to send the switching gap configuration request for the switching gap or release the RRC connection with the first SIM (150*a*) to the first network operator apparatus (200*a*). Further, the UE (100) is configured to start the MUSIM timer after sending the RRC connection release request and detect that the MUSIM timer is expired before receiving a RRC release message from the first network operator apparatus (200*a*). Further, the UE (100) is configured to release the RRC connection locally at the UE (100) and transit to one of an idle state and inactive state. Further, the UE (100) is configured to establish a RRC connection with a second network operator apparatus (200*b*) associated with the second SIM (150*b*) of the plurality of SIMs (150).

The proposed method describes the wireless network (1000) considering two SIMs for the illustration purpose. However, this does not limit the methods and description for multiple SIM cases e.g. where more than two SIMs are supported like 3 SIMs, 4 SIMs, 5 SIMs and so on in the same UE (100). Further illustration, description considers one of the SIM in a connected mode and other SIM in an idle/inactive mode. However, the methods and approaches can be extended to other modes/states and combinations thereof. Also, Radio Access Technology (RAT) of the SIMs can also pertain to others RATs than 5G like 2G, 3G, 4G, 6G, WIFI and so on and possible combinations thereof.

In an example, a New Radio or 5G UE (NR UE) (100) in an idle/inactive mode calculates it's a Paging Occasion (PO) and Paging Frame (PF) based on its UE ID and N, where UE ID: 5G-S-TMSI mod 1024, and N: number of total paging frames in a DRX cycle T of the UE (100). Based on the PO and PF, the UE (100) monitors a Physical Downlink Control Channel (PDCCH) to read paging a DCI i.e. Downlink Control Information (DCI format 1_0 with CRC scrambled by P-RNTI i.e. Paging Radio Network Terminal Identifier) and further reads the paging message. The UE (100) decides if the paging message is intended for it only after reading the actual paging message. All other UEs discard the paging message as a False Alarm. This way, a group of UEs (paging group) reads PDCCH and further paging message based on respective UE_ID and N on the same PO and PF.

The PF and PO for paging are determined by the following formulae:

1. SFN for the PF is determined by: (SFN+PF_offset) mod T=(T div N)*(UE_ID mod N).

2. Index (i_s), indicating the index of the PO is determined by: i_s=floor (UE ID/N) mod Ns Where, the following parameters are used for the calculation of PF and i_s above: T: DRX cycle of the UE, N: number of total paging frames in T, Ns: number of paging occasions for a PF, PF_offset: offset used for PF determination, and UE_ID: 5G-S-TMSI mod 1024. In case when the SIM belongs to LTE, the UE_ID: IMSI mod 1024

An International Subscriber Mobile Identity (IMSI) is a permanent UE identity whereas 5G-S-TMSI is a temporary identity which can be reassigned by a core network to the UE frequently e.g. possibly at every cell reselection a new 5G-S-TMSI could be reassigned.

Apart from paging, one or more of the multiple SIMs can be engaged in system information block (SIB) acquisition, measurement, data or voice call, Multimedia broadcast multicast service (MBMS), emergency call, access stratum (AS) signaling, Non-access stratum (NAS) signaling and so on. Some of these operations are periodic like paging and some are aperiodic and/or un-deterministic like signaling. Further, duration required to complete the operation may also be fixed or unpredictable.

For MUSIM devices, even though the UE (100) supports multiple SIMs and thereby connectivity with multiple networks (1000), however, due to common RF circuitry only one active connection at a time is maintained. That implies UE (100) needs to switch from one network (200*a*) to other network (200*b*) in time to access and avail connectivity. Based on the activities on the specific network (1000), arbitration of the RF between multiple SIMs (and the protocol stocks they support) is to be performed. Objective is to ensure the service performance is maintained at best possible level for each of the SIMs in consideration to the kind of activities or services being availed on each SIM/ network. Therefore, when the RF is tuned away to one of the SIM, other SIMs see it as gap and not uplink or downlink can be performed in the gap.

In one of the embodiment, the method can be used to target the dynamic gap which can be un-deterministic in occurrence. Therefore, such gap cannot be planned beforehand. Also it is important that during the gap, the network (200*a*) also does not transmit anything to the UE (100) nor expects any reception from the UE (100). The network (200*a*) can rather utilize these transmission resources for the other UEs. For this, it is required that the network (200*a*) is aware or rather is informed about the gap. Since the gap is dynamic, the network (200*a*) cannot be informed beforehand. Also, the network (200) cannot know about the gap as there is no coordination with other network(s) servicing other SIMs on the MUSIM device (100). Besides, also the periodic gaps may not be taken by the UE (100) always e.g. it may coincide or conflict with some other priority task. Therefore, it also needs a dynamic mechanism to inform the network (200*a*) as and when needed.

For illustration purpose, the method will consider a scenario where the MUSIM UE (100) comprises of two SIMs and one of the SIMs, SIM A (network A) is connected mode and other SIM B (network B) is in idle/inactive mode. In order to maintain the link and avail paging on SIM B, SIB, measurement operations may need to be performed on SIM B on periodic basis. Besides, there may be some un-deterministic occurrence of signaling need e.g. paging response and dynamic gap may be required. As the gap durations are short and can be estimated or predicted, SIM A can undertake short time switching gap and remains to be in the connected state with maintaining the ongoing services. Meanwhile, during short time switching gap, the SIM B can pursue the desired operations and post gap, the RF control returns to the SIM A. As the SIM A can inform the network A about the short timer switching gap before undertaking the gap, the network (200*a*) can also conserve the transmission resources and utilize same for scheduling of the other UEs (100).

In an embodiment, the UE (100) is configured or pre-configured or it is specified that for which the MUSIM operations, the UE (100) needs to undertake short time switching time gap e.g. a list of operations which may include but not limited to paging reception, busy indication, paging response, SIB reception, measurement operation etc. Alternatively, the UE (100) is configured or pre-configured or it is specified with a threshold duration value with respect to the MUSIM operations, the UE (100) needs to undertake short time switching time gap e.g. MUSIM operations that require gap duration which is less than threshold duration value, the UE (100) undertakes short time switching gap. These configuration and/or pre-configuration for the list of the MUSIM operations and/or threshold duration values are signaled by the network (200*a*) to the UE (100) in the SIB or a RRC message. Alternatively, it can also be specified e.g. in the 3GPP 5G specification which can be followed by the UE (100) and/or network implementers. In another embodiment, the UE (100) takes this decision by itself whether to pursue a short time switching gap for a specific MUSIM operation. Further, the short time switching gap durations for different MUSIM operations are also dependent/decided/configured on the basis of the RAT (Radio Access Technique) of the first network (200*a*) and/or second network (200*b*) e.g. whether first and/or second network (200*a* and 200*b*) are 4G network, 5G network or other RATs. In another embodiment, short time switching gap is required for only once i.e. it is a one shot gap.

Besides there may be (un-deterministically) longer gaps needed when second SIM needs to pursue longer or un-deterministic operations like TAU/RA signaling, any other NAS or AS signaling etc. During this time, SIM A needs to undertake long time switching gaps and SIM B can perform the desired longer operations. The long time switching gaps duration may also be not known or predictable in advance. Further, due to longer gaps there is drastic impact on the ongoing services on the SIM A, if there is any. Based on the priority of the service on SIM A as compared to the priority of the task on SIM B, a decision is taken to pursue long time switching gap. In case there is no ongoing service on SIM A, still it may not be advantageous to keep the SIM A in connected mode while pursuing long timer switching gaps. Further, the longtime switching gap durations for different MUSIM operations are also dependent/decided/configured on the basis of the RAT (Radio Access Technique) of the first network (200*a*) and/or second network (200*b*) e.g. whether first network (200*a*) and/or second network (200*b*) are 4G, 5G or other RATs.

In case of dynamic gap, a Medium Access Control Element (MAC CE) also includes the gap offset or activation time for the gap and possibly duration of the gap. Alternatively, the MAC CE can include the identity of the gap configuration which is provided or negotiated with network earlier with a RRC signaling or a NAS signaling. This informs the network (200*a*) to start the gap from a specified start time and the network (200*a*) can schedule data for present UE (SIM A) until the activation time and during the gap, can use resources for other UEs. With activation time, a clear timing is established between the UE (100) and the network (200*a*) and performance is maintained at best possible level until gap starts. Without activation time in the MAC CE, it is not full-proof to assume gap start timing post HARQ ACK reception (e.g. immediate/after a stipulated time etc.) and performance can degrade if Network applies gap start incorrectly. In case the MAC CE transmission is not successful, as determined by HARQ ACK or confirmation from the network (200*a*), the UE (100) can retransmit or reattempt to activate the gap.

In another embodiment, the MAC CE or the RRC signaling or the NAS signaling is used for one shot gap request. For this purpose, the RRC or the NAS signaling can reuse the short time switching gap and/or request to configure one shot gap with using short timer switching gap request with indicating the gap is for one shot gap. Alternatively, the gap repetition field is not provided signifying gap is one shot only. Similarly, the MAC CE can also be used for one short gap e.g. by specifying one shot gap request and/or indicating short time switching gap for one shot purpose and/or gap duration needed and/or indicating the identify of prior negotiated short time gap. In another embodiment, one shot gap can be availed in the DRX sleep or measurement gap or autonomous gap of the first network (200*a*) to perform MUSIM operation on the second network (200*b*). In this case, the UE (100) is not required to request any explicit gap to the first network (200*a*).

Buffer Status Report (BSR) and Grants: in one of the embodiment, the UE (100) prevents triggering of new BSR (buffer status report) and/or report the newly triggered BSR report to indicate no buffered data i.e. BSR as 0 data when the BSR triggering time lies in between at least one of the following instants:

1. From the time short-time switching request is sent to the time actual gap starts.

2. From the time gap confirmation is received from the network (200*a*) to the time actual gap starts.

3. From the time gap response is received from the network (200*a*) to the time actual gap starts.

4. From the time actual gap starts to the time actual gap ends.

In another embodiment, for the grants which were received from the network (200*a*) by the UE (100), the UE (100) processes grants for which corresponding uplink transmission is pursued before actual gap starts; otherwise, the UE (100) discards the grants for which uplink transmission falls in the gaps.

Alternatively, the UE (100) requests for short time switching gap considering the presence of the buffer status and/or grants. Thereby, the UE (100) plans well for the transmission of the available buffer data and/or available grants before it undertakes the gap. This way, the UE (100) can avoid/prevent the unnecessary discard of buffered data or wastage of resources.

If the transmitting PDCP entity is associated with at least two RLC entities, when indicating the PDCP data volume to a MAC entity for BSR triggering and Buffer Size calculation (as specified in TS 38.321 [4] and TS 36.321 [12]), the transmitting PDCP entity shall:

1. if there is short time switching gap to be pursued:
   a) indicate the PDCP data volume to the MAC entity associated with all RLC entities as 0;
2. else:
   a) if the PDCP duplication is activated for the RB:
      i. indicate the PDCP data volume to the MAC entity associated with the primary RLC entity;
      ii. indicate the PDCP data volume excluding the PDCP Control PDU to the MAC entity associated with the RLC entity other than the primary RLC entity activated for PDCP duplication;
      iii. indicate the PDCP data volume as 0 to the MAC entity associated with RLC entity deactivated for PDCP duplication;
3. else (i.e. the PDCP duplication is deactivated for the RB):
   a) if the split secondary RLC entity is configured; and
   b) if the total amount of PDCP data volume and RLC data volume pending for initial transmission (as specified in TS 38.322 [5]) in the primary RLC entity and the split secondary RLC entity is equal to or larger than ul-DataSplitThreshold:
      i. indicate the PDCP data volume to both the MAC entity associated with the primary RLC entity and the MAC entity associated with the split secondary RLC entity;
      ii. indicate the PDCP data volume as 0 to the MAC entity associated with RLC entity other than the primary RLC entity and the split secondary RLC entity;
4. else, if the transmitting PDCP entity is associated with the DAPS bearer:
   a) if the uplink data switching has not been requested:
      i. indicate the PDCP data volume to the MAC entity associated with the source cell;
   b) else:
      i. indicate the PDCP data volume excluding the PDCP Control PDU for interspersed ROHC feedback associated with the source cell to the MAC entity associated with the target cell;
      ii. indicate the PDCP data volume of PDCP Control PDU for interspersed ROHC feedback associated with the source cell to the MAC entity associated with the source cell;
5. else:
   a) indicate the PDCP data volume to the MAC entity associated with the primary RLC entity;
   b) indicate the PDCP data volume as 0 to the MAC entity associated with the RLC entity other than the primary RLC entity.

For the purpose of the MAC buffer status reporting, the UE (100) shall consider the following as RLC data volume:

1. The RLC SDUs and the RLC SDU segments that have not yet been included in an RLC data PDU.
2. The RLC data PDUs that are pending for initial transmission.
3. The RLC data PDUs that are pending for retransmission (RLC AM).

In addition, if a STATUS PDU has been triggered and t-StatusProhibit is not running or has expired, the UE (100) shall estimate the size of the STATUS PDU that will be transmitted in the next transmission opportunity, and consider this as part of RLC data volume. When the UE (100) undertakes short time switching gap, the UE (100) shall consider RLC data volume to be 0 for the purpose of MAC buffer status reporting.

For regular and periodic BSR, the MAC entity shall, if not going to pursue short time switching gap:

1. If more than one LCG has data available for transmission when the MAC PDU containing the BSR is to be built:
   a) report Long BSR for all LCGs which have data available for transmission.
2. else:
   a) report Short BSR.

The MAC entity shall, if not going to pursue short time switching gap:

1. if the buffer status reporting procedure determines that at least one BSR has been triggered and not cancelled:
2. if UL-SCH resources are available for a new transmission and the UL-SCH resources can accommodate the BSR MAC CE plus its sub header as a result of logical channel prioritization:
   a) instruct the multiplexing and assembly procedure to generate the BSR MAC CE(s).
   b) start or restart periodicBSR-Timer except when all the generated BSRs are long or short Truncated BSRs.
   c) start or restart retxBSR-Timer.
3. if a Regular BSR has been triggered and logicalChannelSR-DelayTimer is not running:
   a) if there is no UL-SCH resource available for a new transmission.
   b) if the MAC entity is configured with configured uplink grant(s) and the Regular BSR was triggered for a logical channel for which logicalChannelSR-Mask is set to false.
   c) if the UL-SCH resources available for a new transmission do not meet the LCP mapping restrictions (see clause 5.4.3.1) configured for the logical channel that triggered the BSR:
   trigger a Scheduling Request.

Measurement and CSI Feedback: the PHY or layer 1 discards the measurement request received from the higher layer (e.g. RRC) or configured by the network (200*a*) for which the measurement resources lie partially or fully in the short time switching gap period or for which measurement report cannot be transmitted prior to the start of the gap.

Further, the UE (100*a*) discards or abandons the CSI reporting for which uplink transmission cannot be completed prior to the start of the short time switching gap period. In case the gap period is small enough (as compared to CSI measurement or reporting window so that the measurement and CSI feedback remains valid even after post gap), post the gap UE can continue measurement or reporting the partially or fully measured CSI feedback before the gap once the UE (100) returns from short time switching gap. The UE (100) can also consider combining measurements or CSI feedback from prior the gap and post the gap to build a complete measurement or CSI feedback. Alternatively, the UE (100) utilizes the measurements or CSI feedback built before the short time switching gap to be reported after the gap. The measurement can include but not limited to L1-RSRP measurement, beam measurement, mobility measurement, positioning measurements etc. The CSI feedback can include but not limited to CQI (Channel Quality Indication), Rank Indicator (RI), Pre-coding Matric indicator (PMI), Positioning measurement, channel measurements like RSRP, RSSI, RSRQ, SINR, etc.

Data inactivity monitoring: In an embodiment, dataInactivityTimer is operated to consider reception and/or transmission of MAC SDU on DCCH and/or DTCH and/or CCCH logical channels. If any MAC entity (which implies at least one of component carriers or serving cells and/or dual/multi connectivity cell-groups and/or serving cells) receives or transmits a MAC SDU, the datalnactivityTimer is started or restarted (i.e. if it is already started and running). Further, when the UE (100) initiates at least one of short time switching gap and long-time switching gap for MUSIM purpose, it stops datalnactivityTimer, if running. When the UE (100) returns from at least one of short time switching gap and long-time switching gap for MUSIM purpose, it restarts datalnactivityTimer, if it was stopped. When the datalnactivityTimer expires, it is indicated to the upper layer e.g. RRC or PDCP etc. For instance, when the RRC receives this indication, it releases the RRC connection and transits the UE (100) to at least one of the idle state and the inactive state.

The UE (100) may be configured by the RRC with a data inactivity monitoring functionality, when the UE (100) is in a RRC_CONNECTED mode. The RRC controls the data inactivity operation by configuring the timer datalnactivityTimer. When the datalnactivityTimer is configured, the UE (100) shall:

1. if any MAC entity receives the MAC SDU for DTCH logical channel, the DCCH logical channel, or the CCCH logical channel; or
2. if any MAC entity transmits the MAC SDU for the DTCH logical channel, or the DCCH logical channel:
   a. start or restart datalnactivityTimer.
3. if the UE (100) initiates short time switching gap for the MUSIM purpose:
   a. stop datalnactivityTimer, if running.
4. if the UE (100) returns from short time switching gap for the MUSIM purpose:
   a. restart datalnactivityTimer, if it was stopped.
5. if the datalnactivityTimer expires:
   a. indicate the expiry of the datalnactivityTimer to the upper layers.

In another embodiment, if short or long switching time gap duration on the SIM A are greater than dataInactivityTimer operated on the SIM A then, the UE (100) considers at least one of the following approaches:

1. The UE (100) overrides dataInactivityTimer i.e. the UE (100) ignores the dataInactivityTimer and even when dataInactivityTimer is expired, the UE (100) does not transit to the idle mode/the inactive mode. When short or long switching timer gap is completed, the UE (100) transits to the idle mode/the inactive mode if the dataInactivityTimer is expired or short or long switching timer gap was greater than dataInactivityTimer duration; alternatively, the UE (100) maintains the connected mode in spite of the dataInactivityTimer is expired or short or long switching timer gap was greater than dataInactivityTimer duration.

2. The UE (100) explicitly goes to the idle mode/the inactive mode i.e. informs the network (200*a*) by signaling the transition to the idle/inactive mode.

3. The UE (100) implicitly goes to the idle/inactive mode i.e. the UE (100) does not send any signaling to the network (200*a*) to inform the transition to the idle/inactive mode.

4. The short or long switching time gaps are bounded by dataInactivityTimer duration. In case, short or long switching timer gap duration happens to be greater than dataInactivityTimer duration, short or long switching timer gap duration is set to dataInactivityTimer duration.

5. The UE (100) stops the dataInactivityTimer when applying short or long switching time gap.

6. The UE (100) stops the dataInactivityTimer only when short or long switching time gap are smaller than a threshold value.

7. The UE (100) stops the dataInactivityTimer only when short or long switching time gap are greater than a threshold value.

8. The UE (100) extends the dataInactivityTimer timer with adding the short or long switching time gap duration, therefore, the UE (100) continues the dataInactivityTimer during the short or long switching time gap.

9. In another embodiment, the UE (100) when undertakes the short time switching gap, the UE (100) stops or halts the DRX timers as specified below. This is to provide additional time for the DRx operation once the UE (100) goes into short time switching gap and there is no transmission or reception during the gap, thereby the conditions for the DRX timer(s) operations are not met.

10. drx-InactivityTimer: the duration after the PDCCH occasion in which a PDCCH indicates a new UL or DL transmission for the MAC entity.

11. drx-RetransmissionTimerDL (per DL HARQ process except for the broadcast process): the maximum duration until a DL retransmission is received.

12. drx-RetransmissionTimerUL (per UL HARQ process): the maximum duration until a grant for UL retransmission is received.

13. drx-HARQ-RTT-TimerDL (per DL HARQ process except for the broadcast process): the minimum duration before a DL assignment for HARQ retransmission is expected by the MAC entity.

14. drx-HARQ-RTT-TimerUL (per UL HARQ process): the minimum duration before a UL HARQ retransmission grant is expected by the MAC entity.

In another embodiment, the UE (100) conditionally stops DRX related HARQ timers (e.g. drx-RetransmissionTimerDL, drx-RetransmissionTimerUL, drx-HARQ-RTT-TimerDL, drx-HARQ-RTT-TimerUL), if (short time switching gap)>=(discard timer for the pertinent radio bearer or service QoS constraint defined packet delay budget value for the specific service packet). Otherwise, the UE (100) does not stop DRx related HARQ timers, if (short time switching gap)<(discard timer for the pertinent radio bearer or service QoS constraint defined packet delay budget value for the specific service packet).

In another embodiment, the UE (100) conditionally stops DRX related HARQ timers (e.g. drx-RetransmissionTimerDL, drx-RetransmissionTimerUL, drx-HARQ-RTT-TimerDL, drx-HARQ-RTT-TimerUL), if (short time switching gap)>=(t-Reordering for the pertinent radio bearer). Otherwise, the UE (100) does not stop DRx related HARQ timers, if (short time switching gap)<(t-Reordering for the pertinent radio bearer).

In another embodiment, the UE (100) when undertakes the short time switching gap, the UE (100) does stop the DRX timers as specified below. This is to ensure same QoS constraint e.g. latency or delay limit for the packet transmission/reception. Further to achieve the same objective, the short time switching gap duration can be subtracted from DRX timers and DRX timers are stopped at start of short time switching gap and restarted at the end of the short time switching gap (if after subtracting short time switching gap duration, specific DRX timer(s) remaining duration is greater than 0); otherwise, the UE (100) considers specific DRX timer(s) to be expired.

In another embodiment, uplink and/or downlink HARQ buffers are conditionally or non-conditionally cleared/purged/flushed by the UE (100), when the UE (100) undertakes short time switching gap on SIM A for MUSIM operation on SIM B. Following options are considered for this purpose—

1. Option 1:
   - a. The UE (100) conditionally clears uplink and/or downlink HARQ buffers:
     - i. If short time switching gap>=discard timer for the pertinent radio bearer or service QoS constraint defined packet delay budget value for the specific service packet.
   - b. The UE (100) conditionally does not clear uplink and/or downlink HARQ buffers:
     - ii. If short time switching gap<discard timer for the pertinent radio bearer or service QoS constraint defined packet delay budget value for the specific service packet.
2. Option 2:
   - a. The UE (100) conditionally clears uplink and/or downlink HARQ buffers
     - i. If the short time switching gap>=t-Reordering timer for the pertinent radio bearer
   - b. The UE (100) conditionally does not clear uplink and/or downlink HARQ buffers
     - i. If short time switching gap<t-Reordering timer for the pertinent radio bearer
3. Option 3:
   - a. The UE (100) clears the uplink and/or downlink HARQ buffers when the UE (100) undertakes short time switching gap.
4. Option 4:
   - a. The UE (100) does not clear the uplink and/or downlink HARQ buffers when the UE (100) undertakes short time switching gap.

In another embodiment, the UE (100) starts a new timer discardTimer upon reception at the PDCP of an SDU from upper layer. When the UE (100) undertakes the short time switching gap for MUSIM operation purpose, discardTimer is not stopped, if running. This is to ensure same QoS constraint e.g. latency or delay limit for the packet transmission. Further to achieve the same objective, the short time switching gap duration can be subtracted from discardTimer timer and discardTimer is stopped at start of short time switching gap and restarted at the end of the short time switching gap (if after subtracting short time switching gap duration, discardTimer timer remaining duration is greater than 0); otherwise, the UE (100) considers discardTimer timer to be expired.

Alternatively, in another embodiment, when the UE (100) undertakes the short time switching gap for MUSIM operation purpose, discardTimer is stopped, if running. This is just to consider that there is no transmission or reception opportunity in the gap period and thereby, providing an additional time for the UE (100) to complete the successful transmission. Further to achieve the same objective, the short time switching gap duration can be added to the discardTimer to provide additional time and discardTimer is not stopped, if running.

The transmitting PDCP entity shall maintain the following timers:

i. discardTimer

This timer is configured only for DRBs. The duration of the timer is configured by upper layers TS 38.331. In the transmitter, a new timer is started upon reception of an SDU from upper layer. When the UE (100) undertakes the short time switching gap for MUSIM operation purpose, discardTimer is not stopped, if running.

In another embodiment, this timer is used to detect loss of PDCP Data PDUs. Only one t-Reordering per receiving PDCP entity is running at a given time i.e. if t-Reordering is running, t-Reordering is not started additionally. When the UE (100) undertakes the short time switching gap for MUSIM operation purpose, t-Reordering is stopped, if running. This is to consider that during the UE (100) does not transmit or receive any receive any PDCP Data PDU and therefore, there is reordering operation cannot be pursued. Further to achieve the same objective, the short time switching gap duration can be added to t-Reordering timer to provide additional time and there is no need to stop the t-Reordering.

Alternatively, in another embodiment, when the UE (100) undertakes the short time switching gap for MUSIM operation purpose, t-Reordering is not stopped, if running. This is just to conclude the reordering operation within the specified time limit. Further to achieve the same objective, the short time switching gap duration can be subtracted from t-Reordering timer and t-Reordering is stopped at start of short time switching gap and restarted at the end of the short time switching gap (if after subtracting short time switching gap duration, t-Reordering timer remaining duration is greater than 0); otherwise, the UE considers t-Reordering timer to be expired.

The receiving PDCP entity shall maintain the following timers: t-Reordering: the duration of the timer is configured by upper layers TS 38.331, except for the case of NR side link communication. For NR side link communication, the t-Reordering timer is determined by the UE implementation. This timer is used to detect loss of PDCP Data PDUs. If t-Reordering is running, t-Reordering shall not be started additionally, i.e. only one t-Reordering per receiving PDCP entity is running at a given time. When the UE (100) undertakes the short time switching gap for MUSIM operation purpose, t-Reordering is stopped, if running.

Local deactivation and activation of Configurations/Reporting: When undertaking MUSIM short time switching gap, the UE (100) (SIM deactivates one or more of a UE-specific PDSCH TCI state, Semi-persistent CSI-RS/CSI-IM resource set, Semi-persistent CSI reporting on PUCCH, Semi-persistent SRS, Semi-persistent ZP CSI-RS resource set, Semi-persistent Positioning SRS etc.

When the UE (SIM A) (100) returns from short time switching gap, the UE (100) activates one or more of the afore-mentioned configurations/reporting. In general, the activation and deactivation is performed for afore-mentioned when the MAC CE is received from the network (200*a*). However, in case of short time switching gap, the MAC entity in the UE (SIM A) (200*a*) can locally issue a deactivation and activation to the lower layer. It is possible lower is not aware about the MUSIM operations and/or is not maintaining the activated or deactivated states of the afore-mentioned parameters/configurations across the short-time switching gap e.g. not maintain memory or database etc. Therefore, there is need to store and restore the parameters and configurations across the short time switching gaps.

In another embodiment, the local deactivation of the aforementioned configurations or reporting is pursued at least at one of the following instances:

1. When the UE (100) sends the short time switching gap request to the network (200*a*).

2. When the UE (100) receives the confirmation of the short time switching gap request.

3. When the UE (100) receives short time switching gap response message from the network (200*a*).

4. When the UE (100) applies the short time switching gap i.e. start point of short time switching gap.

5. At the earliest time instant when the specific configuration or reporting is triggered the actual transmission or reporting falls within the gap. Therefore, this time instant can be per specific configuration or reporting.

Recommended Bit Rate: In another embodiment, the UE (100) requests the gNB to indicate the recommended bit rate for a specific logical channel and a specific direction. If the MAC entity is requested by upper layers to query the gNB for the recommended bit rate for a logical channel and for a direction (i.e. for uplink or downlink), the MAC entity shall:

1. If the recommended bit rate query for this logical channel and this direction has not been triggered and the UE (100) is not going to take a short time switching gap, trigger a recommended bit rate query for this logical channel, direction, and desired bit rate.

2. If the UE (100) is going to take a short time switching gap, MAC entity shall indicate to upper layers the recommended bit rate for the logical channel as 0.

3. Post returning from the short time switching gap, MAC entity shall indicate to upper layers, the recommended bit rate for the indicated logical channel and direction that was before the gap.

4. Alternatively, post returning from the short time switching gap, MAC entity shall also trigger a recommended bit rate query for this logical channel, direction, and desired bit rate. Upon reception of a recommended bit rate MAC CE the MAC entity shall indicate to upper layers the recommended bit rate for the indicated logical channel and direction.

5. Alternatively, when MAC entity is about to undertake short time switching gap, upper layer does not query the gNB for the recommended bit rate for a logical channel and for a direction (i.e. for uplink or downlink) i.e. no request is given to MAC from upper layer.

Recommended Bit Rate: The recommended bit rate procedure is used to provide the MAC entity with information about the bit rate which the gNB recommends. The bit rate is the recommended bit rate of the physical layer. Averaging window of default value 2000 ms will apply as specified in TS 26.114. The gNB may transmit the Recommended bit rate MAC CE to the MAC entity to indicate the recommended bit rate for the UE (100) for a specific logical channel and a specific direction (either uplink or downlink). Upon reception of a recommended bit rate MAC CE the MAC entity shall:

1. Indicate to upper layers the recommended bit rate for the indicated logical channel and direction.

The MAC entity may request the gNB to indicate the recommended bit rate for a specific logical channel and a specific direction. If the MAC entity is requested by upper layers to query the gNB for the recommended bit rate for a logical channel and for a direction (i.e. for uplink or downlink), the MAC entity shall:

1. If a Recommended bit rate query for this logical channel and this direction has not been triggered and UE (100) is not going to take a short time switching gap:

a) Trigger a Recommended bit rate query for this logical channel, direction, and desired bit rate.

If the UE (100) is going to take a short time switching gap, MAC entity shall indicate to upper layers the recommended bit rate for the logical channel as 0. Post returning from the short time switching gap, MAC entity shall indicate to upper layers, the recommended bit rate for the indicated logical channel and direction that was before the gap.

If the MAC entity has UL resources allocated for new transmission the MAC entity shall:

1. For each Recommended bit rate query that the Recommended Bit Rate procedure determines has been triggered and not cancelled:

a) if bitRateQueryProhibitTimer for the logical channel and the direction of this Recommended bit rate query is configured, and it is not running; and b) if the MAC entity has UL resources allocated for new transmission and the allocated UL resources can accommodate a Recommended bit rate MAC CE plus its sub header as a result of LCP:

i. instruct the Multiplexing and Assembly procedure to generate the Recommended bit rate MAC CE for the logical channel and the direction of this Recommended bit rate query;

ii. start the bitRateQueryProhibitTimer for the logical channel and the direction of this Recommended bit rate query;

iii. Cancel this recommended bit rate query.

In order to pursue short time switching and longtime switching (i.e. RRC connection release on first network/SIM A), UE is configured to signal the first network a preference to switch from first network with keeping RRC connection to first network (i.e. RRC_CONNECTED state) and a preference to switch from first network with leaving RRC connection to first network (i.e. RRC_IDLE or RRC_INACTIVE state) respectively. This is signaled to the network in a RRC signaling message e.g. MUSIM assistance information or UE assistance information message. For short time switching, the MUSIM assistance information message includes at least one of setup or release of gaps and associated gap configuration request for periodic or aperiodic/one-shot gaps. For long time switching, the MUSIM assistance information message does not include gap configuration request and rather have a preference of the RRC_IDLE or RRC_INACTIVE state after RRC connection release.

In an embodiment, the UE (100) is configured or pre-configured or it is specified that for which MUSIM operations, the UE (100) needs to undertake long time switching gap e.g. a list of operations which may include but not limited to TAU, RA signaling, any other AS or NAS signaling, busy indication, paging response etc. Further, for paging reception, measurements (e.g. serving cell measurement and/or neighbor cell measurement including intra-frequency, inter-frequency and inter-RAT measurements) and system information reception for second NW, UE undertakes short time switching gaps. Alternatively, the UE (100) is configured or pre-configured or it is specified with a threshold duration value with respect to the MUSIM operations, the UE (100) needs to undertake long time switching time gap e.g. MUSIM operations that require gap duration which is greater than threshold duration value, the UE undertakes long time switching gap (i.e. UE releases RRC connection on the first network (SIM A) and establishes a RRC connection with second network (SIM B). These configuration and/or pre-configuration for the list of MUSIM operations and/or threshold duration values are signaled by the network to UE in SIB or RRC message (e.g. MUSIM gap configuration in the RRC reconfiguration message).

Alternatively, it can also be specified e.g. in the 3GPP 5G specification which can be followed by the UE (100) and/or network implementers. In another embodiment, the UE takes this decision by itself whether to pursue a long time switching gap for a specific MUSIM operation. In another approach, UE (100) considers dataInactivityTimer duration as threshold duration value for determining whether UE (100) pursues short time switching gap or long time switching gap e.g. when gap needed is greater than dataInactivityTimer duration than the UE (100) undertakes long time switching gap; otherwise, UE (100) undertakes short time switching gap. In another alternative, the UE (100) can consider the remaining time of the dataInactivityTimer (when it is running) for the threshold duration value.

RRC Release: In another embodiment, the UE (100) initiates a request for RRC Release on SIM A whenever there is long switching time gap needed to address the operation on SIM B. For this purpose, the UE (100) triggers sending at least one of RRC signaling message e.g. the UE assistance information message, MUSIM assistance information, RRC Release request message etc., and MAC Control Element (CE) that indicates the request for the RRC Release. The UE (100) indicates the reason for RRC release as MUSIM operation in the RRC/MAC message or the RRC/MAC message is specifically used for this purpose and it is known from the message type that the reason is for MUSIM operation.

The UE (100) can as well indicate the specific MUSIM operation to be pursued on other SIM. Additionally, the UE can indicate the preference for the target RRC state e.g. idle mode or Inactive mode. The UE (100) determines the preferred RRC state on the basis of one or more of factors that include but not limited to duration of the long time switching gap, presence/absence/priority of the ongoing service on SIM A, Priority of the potential service/task on SIM B, power saving preference for the UE, disabling of the SIM A, battery status of the UE (100), connected to power supply or not, mobility status, whether both SIMs belong to same network/operator. Further, UE (100) can also indicate duration by when the UE (100) may be returning back to connected state, so that Network is aware and also initiate or defers the connection towards UE (100) in case there is data arrival for the UE (100).

In a scenario, network may consider the priority or urgency of the service for which data is arrived and then accordingly decide to defer lower priority service data arrival and initiate connection for higher priority service data arrival.

In another embodiment, the UE (100) receives RRC Reject or RRC Release Reject from the network, even though the UE (100) has requested for RRC Release to the network. Network may have some other priority data or signaling for the UE (100) or network may decide to not consider the RRC Release request of the network for the time being. Further UE may receive RRC Reject or RRC Release Reject with waitTime, the UE (100) starts a timer (e.g. T302) and UE (100) is barred for making another request until the waitTime is elapsed (i.e. timer is expired).

Alternatively, the UE (100) receives RRC Release with suspend configuration from the network, even though UE (100) has requested for RRC Release to the network. Network may have some other priority data or signaling to be coming up shortly and may decide to rather move UE (100) to RRC Inactive mode, even though the UE (100) may not have required any RRC state preference or would have indicated RRC Idle as preferred state.

Alternatively, the UE (100) waits for a stipulated time period (e.g. start a timer T3xx with a specified/configured time duration) and request RRC release to the network. In an embodiment UE starts the timer T3xx after sending the request for RRC release (e.g. in a MUSIM assistance information). In another embodiment, UE starts the timer after successful sending of the request for RRC release (e.g. through a reception of L2 ACK or RLC ACK). In case there is no response from the network (e.g. RRC Release or RRC Reject etc.) and/or RRC release request message was not successfully transmitted from the UE (100) or it is not acknowledged e.g. due to poor channel conditions or decoding errors etc., the UE (100) upon the expiry of the timer T3xx locally releases the RRC connection and moves to Idle mode or Inactive mode. In another embodiment, upon local release UE (100) moves only to idle mode even though the UE (100) wanted or have requested RRC preferred state as Inactive mode in RRC Release Request.

In another embodiment, the UE (100) has not received RRC Release or RRC Reject message from network in stipulated time (i.e. timer duration of timer T3xx), however, the UE (100) has received L2 acknowledgement of the successful transmission of the RRC Release message, then the UE (100) locally releases the RRC connection and moves to Idle or Inactive mode.

1. if RRCReject or RRCReleaseReject is received in response to RRC Release Request (for long time switching gap):
   a) inform upper layers about the failure to release the RRC connection, upon which the procedure ends;

In an embodiment, an example of specification for timer T3xx and UE behavior is described as follows:

The UE shall:

1> if T3xx expires:

2> perform the actions upon going to RRC_IDLE, with release cause 'other'.

1> if configured to provide MUSIM assistance information:

2> if the UE needs to leave RRC_CONNECTED state:

3> set musim-PreferredRRC-State to the desired RRC state.

3> initiate transmission of the UEAssistanceInformation message to provide MUSIM assistance information;

3> start the timer T3xx, if configured, with the timer value set to the MUSIM-LeaveWithoutResponseTimer;

In another embodiment, timer T3xx may not be configured or configured for an infinite time (infinite time implying UE always waits for the network response).

In another embodiment, network commands or indicates to the MUSIM UE (100) to not pursue MUSIM gap in case network expects or knows the arrival of some downlink data, call or some other urgent service or operation to be performed. This may also include the potential duration until which MUSIM gap or operations are not be requested or performed by UE.

In another embodiment, when the UE (100) undertakes coordinated gap with the network A for MUSIM purpose for the network B and if UE (100) completes the MUSIM task earlier than gap duration, UE (100) takes one of the alternatives as—

1. Alternative A: UE (100) waits for the gap duration completion and then only resumes operation on network A; or
2. Alternative B: UE (100) sends return message on network A when it wants to resumes operation on network A earlier than gap duration In another embodiment, the UE (100) determines the alternative A or B on basis of the gap duration remaining and time needed to resume the operation on network A (e.g. scheduling request or Random access operations needed to resume the operation on network A). Scheduling request have some configured periodicity and similarly, RACH operation requires certain time to complete the random access. When the gap duration remaining is quite large than the determined resumption operation on network A, the UE (100) decides to take alternative B; otherwise UE undertakes alternative A.

In another embodiment, more specifically UE does not undertake SR and/or RACH preamble transmission in the MUSIM gap (network switching gap), however, undertakes SR and/RACH preamble transmission in the MUSIM gap, if it is meant for early return.

Further, invention specifies that network honors the scheduling request and/or random access from the UE (100) which was given gap for MUSIM operation by the network. In another embodiment, to speed up RACH operation in gap or identify the RACH for early return purpose, network can configure or specify a special or specific RACH preamble so that the UE (100) can return from the MUSIM gap earlier with network able to determine and/or serve it quickly. Network may allow SRS transmission in case early return is to be supported and network quickly restores the uplink synchronization of the UE (100). Further, the UE (100) can perform SSB (Synchronization Signal Block)/DMRS (Demodulation Reference Signal)/CSIRS (Channel State indicator Reference Signal)/TRS (Tracking Reference signal)/PTRS (Phase Tracking Reference Signal) measurements, AGC (Automatic Gain Control)/AFC (automatic Frequency Control) synchronization, CSI feedback, HARQ retransmission, HARQ feedback etc. operations once it returns early. Alternatively, these operations are prohibited or not supported or not allowed in case early return from MUSIM gap. For example, network stops transmitting UE specific reference signal like CSI-RS once UE (100) goes to perform MUSIM gap. Network resumes transmission of the CSI-RS and/or other UE (100) specific reference signals once UE (100) comes back from MUSIM gap or at the end of the coordinated MUSIM gap.

In another embodiment, it is specified that network ensures providing grant at the earliest possible occasion after completion of the MUSIM gap so that there is no delay encountered by the UE (100) in network A once it returns from gap. Otherwise, the UE (100) needs to carry out scheduling request or Random access procedure to avail the grant which would cause delay in proper resumption of the service or a longer ramping up of the data rates. Further, network considers the BSR report and/or CSI feedback which it received before the MUSIM to consider whether to provide uplink grant/downlink allocation and/or grant size/MCS (Modulation Coding Scheme) etc. Alternatively, or additionally, UE (100) can utilize the CSI feedback and/or measurement report it has before the MUSIM gap and report the same at the earliest post MUSIM gap. In another embodiment, UE (100) can derive the CSI feedback or measured quantities as average or weighted sum of some combinations of quantities before and after MUSIM gap (i.e. pre and post gap) feedback or measurements.

Further, in another embodiment, Scheduling request is suspended during the MUSIM gap, that means network would not allow or honor scheduling request from the UE during the MUSIM gap. It is either specified in standards or configured by the network whether network allows or prohibits the UE (100) from performing Scheduling Request during MUSIM gap.

In another embodiment, the UE (100) when undertakes the short time switching gap, the UE (100) stops or halts the bwp-Inactivity timers. Alternatively, the UE (100) can keep running the bwp-Inactivity timers while undertaking the short time switching gap.

For each activated Serving Cell configured with a BWP, the MAC entity shall:

1. if a BWP is activated and the active DL BWP for the Serving Cell is not the dormant BWP and UE (100) is not in MUSIM gap:
   a) transmit on UL-SCH on the BWP;
   b) transmit on RACH on the BWP, if PRACH occasions are configured;
   c) monitor the PDCCH on the BWP;
   d) transmit PUCCH on the BWP, if configured;
   e) report CSI for the BWP;
   f) transmit SRS on the BWP, if configured;
   g) receive DL-SCH on the BWP;
   h) (re-)initialize any suspended configured uplink grants of configured grant Type 1 on the active BWP according to the stored configuration, if any, and to start in the symbol according to rules;
   i) if lbt-FailureRecoveryConfig is configured:
      i. stop the lbt-FailureDetectionTimer, if running;
      ii. set LBT_COUNTER to 0;
      iii. monitor LBT failure indications from lower layers.
2. When UE (100) enters into MUSIM gap:
   a) not transmit on UL-SCH;
   b) not transmit on RACH;
   c) not monitor the PDCCH;
   d) not transmit PUCCH;
   e) not report CSI;
   f) not transmit SRS;
   g) not receive DL-SCH;
   h) suspend any configured downlink assignment and configured uplink grant of configured grant Type 2 on the BWP;
   i) suspend any configured uplink grant of configured grant Type 1 on the inactive BWP.
   j) stop monitor LBT failure indications from lower layers
   k) stop the lbt-FailureDetectionTimer, if running
3. When the UE (100) returns from MUSIM gap:
   a) transmit on UL-SCH;
   b) transmit on RACH, if PRACH occasions are configured;
   c) monitor the PDCCH;
   d) transmit PUCCH, if configured;
   e) report CSI;
   f) transmit SRS, if configured;
   g) receive DL-SCH;
   h) (re-)initialize any suspended configured uplink grants of configured grant Type 1
   i) (re-)initialize any suspended configured downlink assignments and uplink grants of configured grant Type 2 l) if lbt-FailureRecoveryConfig is configured:

i. stop the lbt-FailureDetectionTimer, if running;

ii. set LBT_COUNTER to 0;

iii. monitor LBT failure indications from lower layers.

In another embodiment, network switches the active BWP of the UE (100) when it is performing short time switching gap and/or long time switching gap. The new BWP can be one of initial BWP, default BWP, one of the configured BWPs or dedicated BWPs, or BWP with smaller size etc.

In another embodiment, when the UE (100) is dual/multiple RX and/or TX capable and UE (100) can rather utilize one or more of its RX and/or TX RF chains to perform MUSIM operation instead of completely disabling reception and/or transmission in the coordinated MUSIM gap. In this case UE (100) can utilize same mechanism and informs network on the UE's capability or support of number of RX and/or TX during the coordinated gap. Accordingly, network can adjust the MCS/grant/allocation for the UE (100) and/or continue transmitting UE specific reference signal and/or allow scheduling request, measurement and other procedures etc. The UE (100) can indicate the capability or RX/TX support through UE capability message or RRC signaling or as part of MUSIM gap request configuration. This may also be dynamically changed and informed to the network e.g. when signal conditions vary, different number of RX/TX can be utilized during MUSIM gap on two networks.

Figure 3:
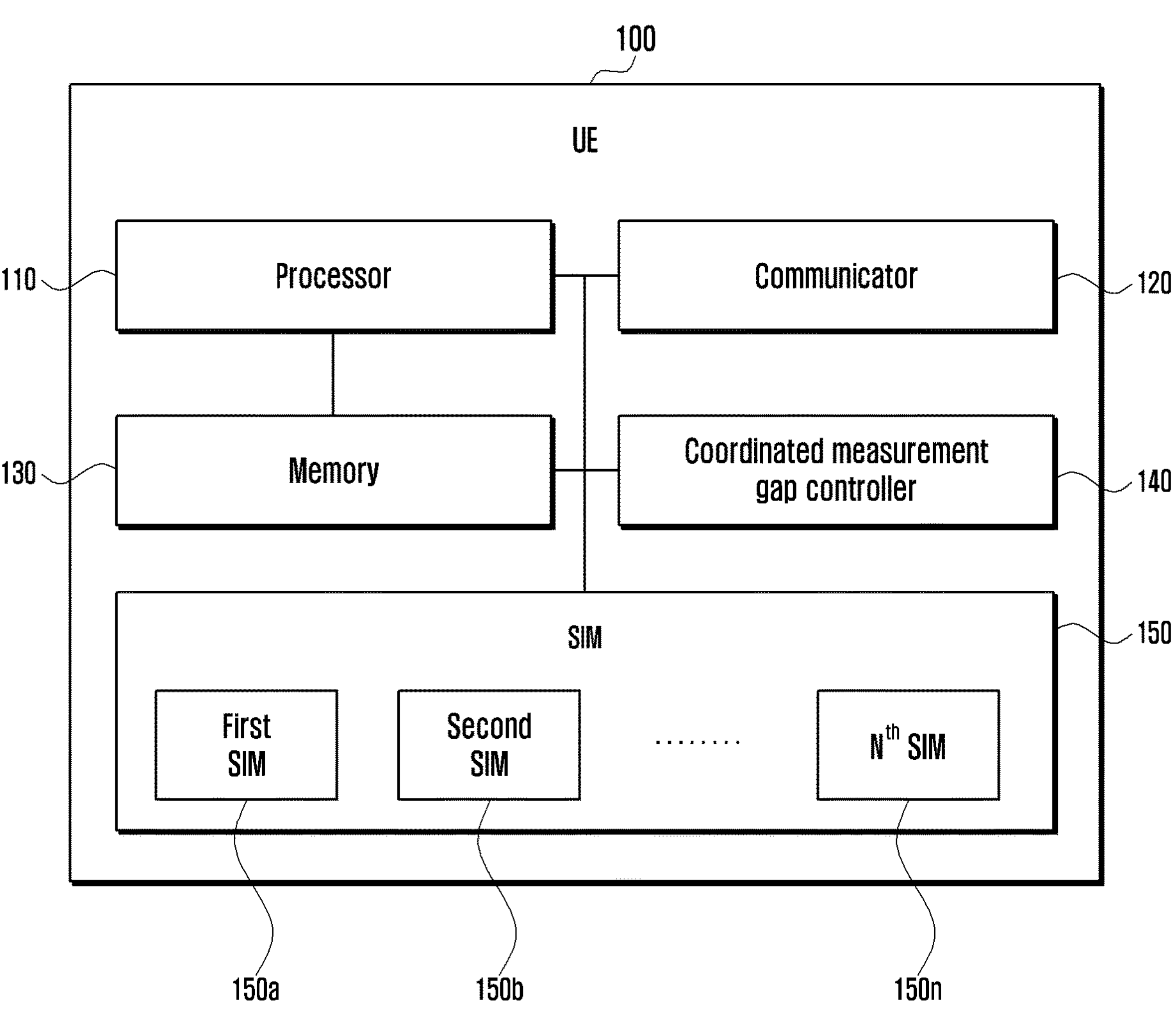
FIG. 3 shows various hardware components of the UE, according to an embodiment as disclosed herein.

FIG. 3 shows various hardware components of the UE (100), according to an embodiment as disclosed herein. In an embodiment, the UE (100) includes a processor (110), a communicator (120), a memory (130) and a coordinated switching gap controller (140). The processor (110) is coupled with the communicator (120), the memory (130), and the coordinated switching gap controller (140).

The coordinated switching gap controller (140) is configured to send the switching gap configuration request to the first network operator apparatus (200*a*) associated with the first SIM (150*a*) of the plurality of SIMs (150). Based on the switching gap configuration request, the coordinated switching gap controller (140) is configured to receive the switching gap configuration from the first network operator apparatus (200*a*). The switching gap configuration includes the switching gap start and stop time, the switching gap duration, and the number of repetitions of the switching gap. Further, the coordinated switching gap controller (140) is configured to detect that the BSR triggering, grant for uplink transmission, and measurement report and CSI reporting time for the first network operator apparatus (200*a*) lies in between one of the switching gap start and stop time, the switching gap duration, and the number of repetitions of the switching gap. In an embodiment, based on the detection, the coordinated switching gap controller (140) is configured to prevent the triggering of the BSR to the first network operator apparatus (200*a*). In another embodiment, based on the detection, the coordinated switching gap controller (140) is configured to report a new BSR report to the first network operator apparatus (200*a*) to indicate no buffered data. In another embodiment, based on the detection, the coordinated switching gap controller (140) is configured to process the grant for which the corresponding uplink transmission is pursued before start of the switching gap and discarding the grants for which the uplink transmission falls in the between the switching gap. In another embodiment, based on the detection, the coordinated switching gap controller (140) is configured to abandon or discarding the measurement report or the CSI reporting from the UE (100).

Further, the coordinated switching gap controller (140) is configured to detect a switch condition based on the MUSIM operation type, a switching gap duration meeting a switching gap threshold duration, and the switching gap duration is greater than a duration of a data inactivity timer. Further, the coordinated switching gap controller (140) is configured to switch from the first SIM (150*a*) to the second SIM (150*b*). In an embodiment, the coordinated switching gap controller (140) is configured to perform the MUSIM operation with a second network operator apparatus (200*b*) associated with the second SIM (150*b*) based on the switching gap configuration. In another embodiment, the coordinated switching gap controller (140) is configured to perform the MUSIM operation with the second network operator apparatus (200*b*) associated with the second SIM (150*b*) based on the RRC release with the first network operator apparatus (200*a*) and establish a RRC connection with the second network operator apparatus (200*b*).

Further, the coordinated switching gap controller (140) is configured to detect a start of the switching gap and detect whether the MUSIM operation is completed earlier than the switching gap duration. In an embodiment, based on the detection, the coordinated switching gap controller (140) is configured to transmit SR and RACH Request to the first network operator apparatus (200*a*) upon completion of the at least one MUSIM operation earlier than the switching gap duration. In another embodiment, based on the detection, the coordinated switching gap controller (140) is configured to detect that the switching gap duration is completed upon completion of the at least one MUSIM operation earlier than the switching gap duration, and transmit one of SR and RACH Request to the first network operator apparatus (200*a*) upon completion of the switching gap duration Further, the coordinated switching gap controller (140) is configured to detect start of the switching gap and detect stop of the switching gap. In an embodiment, based on the detection, the coordinated switching gap controller (140) is configured to trigger the BSR report to the first network operator apparatus (200*a*) after the switching gap is stopped. In another embodiment, based on the detection, the coordinated switching gap controller (140) is configured to reuse previous measurement and CSI feedback after the switching gap is stopped and reports the previous measurement and CSI feedback to the first network operator apparatus (200*a*). In another embodiment, based on the detection, the coordinated switching gap controller (140) is configured to reuse previous measurement and CSI feedback and performing new measurement and CSI feedback after the switching gap is stopped, combine previous measurement and CSI feedback, and new measurement and CSI feedback, and report the combined previous measurement and CSI feedback and new measurement and CSI feedback to the first network operator apparatus (200*a*). In another embodiment, based on the detection, the coordinated switching gap controller (140) is configured to perform new measurement and CSI feedback after the switching gap is stopped and reporting the new measurement and CSI feedback to the first network operator apparatus (200*a*).

Further, the coordinated switching gap controller (140) is configured to detect a presence of the buffer status at the UE (100) and grants for uplink transmission at UE (100) and send a request for the switching gap based on the presence of the buffer status and the grants. Further, the coordinated switching gap controller (140) is configured to report a MAC buffer status by considering PDCP and RLC data volume to be 0 to the first network operator apparatus (200*a*).

Further, the coordinated switching gap controller (140) is configured to detect start of the switching gap and stop the data inactivity timer in response to detecting the start of the switching gap. Further, the coordinated switching gap controller (140) is configured to detect stop of the switching gap, and start or restart the data inactivity timer in response to detecting the switching gap is stopped.

Further, the coordinated switching gap controller (140) is configured to detect whether the data inactivity timer is expired during the switching gap and continue the UE (100) in a RRC connected state by ignoring the expiry of the data inactivity timer during switching gap or restarting the data inactivity timer during the switching gap.

Further, the coordinated switching gap controller (140) is configured to detect start of the switching gap and stop a bandwidth part (bwp)-Inactivity timer in response to detecting the start of the switching gap. Further, the coordinated switching gap controller (140) is configured to detect stop of the switching gap and start or restart the bwp-Inactivity timer in response to detecting the switching gap is stopped.

Further, the coordinated switching gap controller (140) is configured to detect whether the bwp-Inactivity timer is expired during the switching gap and continue the UE (100) in a RRC connected state by ignoring the expiry of the bwp-Inactivity timer during the switching gap or restarting the bwp-Inactivity timer during the switching gap.

Further, the coordinated switching gap controller (140) is configured to determine whether one of the duration of the switching gap is greater than or equal to a discard timer, and the duration of the switching gap is greater than or equal to a t-reordering timer. In an embodiment, the coordinated switching gap controller (140) is configured to clear the UL and DL HARQ buffers in response to determining one of the duration of the switching gap is greater than or equal to the discard timer, and the duration of the switching gap is greater than or equal to the t-reordering timer, wherein the UL and DL buffers are cleared at the start of the switching gap. In another embodiment, the coordinated switching gap controller (140) is configured to stop at least one DRX timer in response to determining one of the duration of the switching gap is greater than or equal to the discard timer, and the duration of the switching gap is greater than or equal to the t-reordering timer, where the UL and DL buffers are cleared at the start of the switching gap. In another embodiment, the coordinated switching gap controller (140) is configured to maintain the UL and the DL HARQ buffers in response to determining one of the duration of the switching gap is not greater than or equal to the discard timer, and the duration of the switching gap is not greater than or equal to the t-reordering timer, wherein the UL and DL buffers are maintained during the switching gap. In an embodiment, the coordinated switching gap controller (140) is configured to maintain at least one DRX timer in response to determining one of the duration of the switching gap is not greater than or equal to the discard timer, and the duration of the switching gap is not greater than or equal to the t-reordering timer, wherein the UL and DL buffers are maintained during the switching gap.

Further, the coordinated switching gap controller (140) is configured to establish an RRC connection with the first SIM (150*a*) of the plurality of SIMs (150). Further, the coordinated switching gap controller (140) is configured to receive the configuration of the MUSIM timer from the first network operator apparatus (200*a*) associated with the first SIM (150*a*). Further, the coordinated switching gap controller (140) is configured to send the switching gap configuration request for the switching gap or release the RRC connection with the first SIM (150*a*) to the first network operator apparatus (200*a*). Further, the coordinated switching gap controller (140) is configured to start the MUSIM timer after sending the RRC connection release request and detect that the MUSIM timer is expired before receiving a RRC release message from the first network operator apparatus (200*a*). Further, the coordinated switching gap controller (140) is configured to release the RRC connection locally at the UE (100) and transit to one of an idle state and inactive state. Further, the coordinated switching gap controller (140) is configured to establish a RRC connection with a second network operator apparatus (200*b*) associated with the second SIM (150*b*) of the plurality of SIMs (150).

The coordinated switching gap controller (140) is physically implemented by analog and/or digital circuits such as logic gates, integrated circuits, microprocessors, microcontrollers, memory circuits, passive electronic components, active electronic components, optical components, hardwired circuits and the like, and may optionally be driven by firmware.

Further, the processor (110) is configured to execute instructions stored in the memory (130) and to perform various processes. The communicator (120) is configured for communicating internally between internal hardware components and with external devices via one or more networks. The memory (130) also stores instructions to be executed by the processor (110). The memory (130) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In certain examples, a non-transitory storage medium may store data that can, over time, change (e.g., in Random Access Memory (RAM) or cache).

Although the FIG. 3 shows various hardware components of the UE (100) but it is to be understood that other embodiments are not limited thereon. In other embodiments, the UE (100) may include less or more number of components. Further, the labels or names of the components are used only for illustrative purpose and does not limit the scope of the invention. One or more components can be combined together to perform same or substantially similar function in the UE (100).

Figure 4:
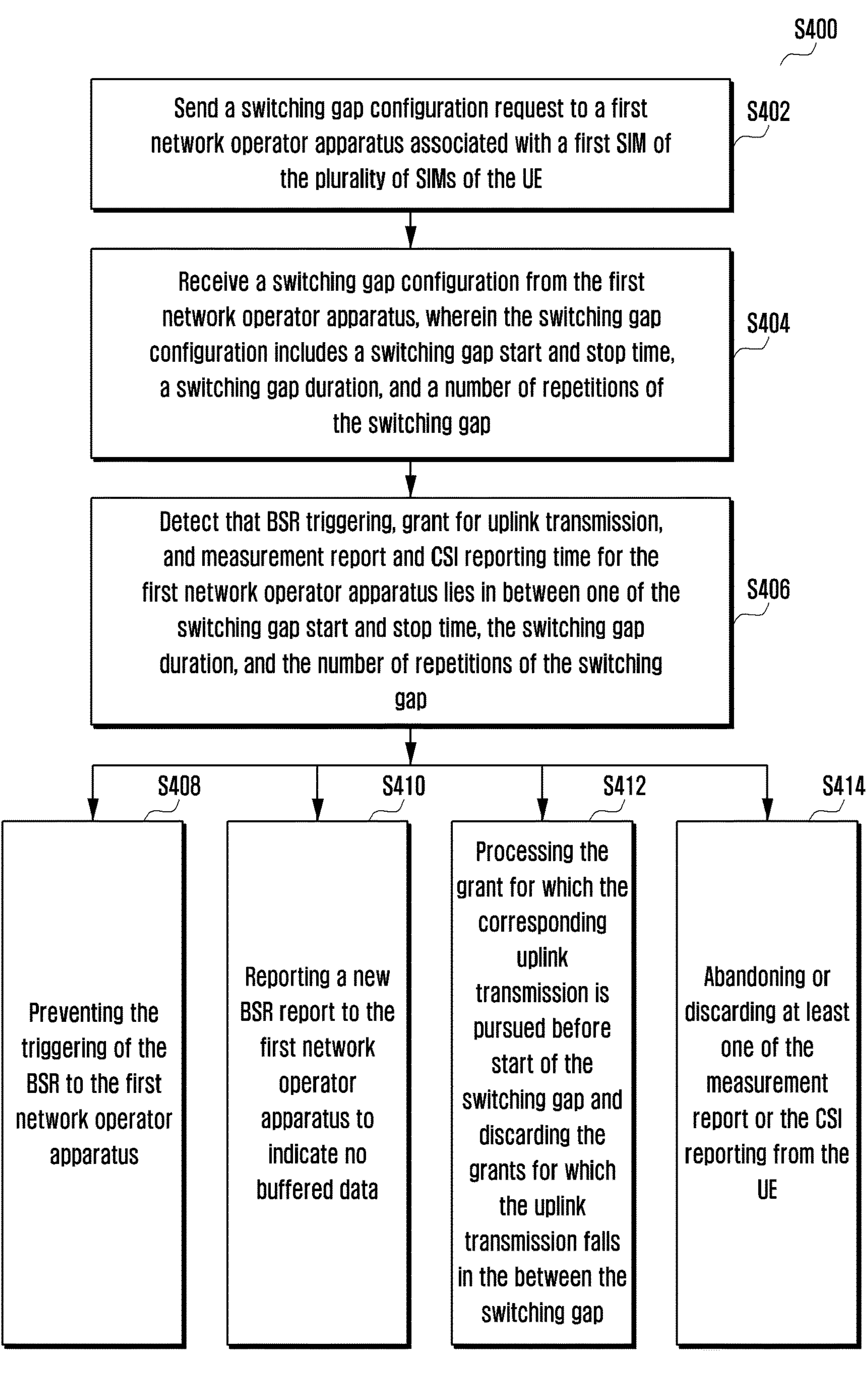
FIG. 4 is a flow chart illustrating a method, implemented by the UE, for coordinated switching gap operations by the UE comprising the plurality of SIMs in the wireless network, according to an embodiment as disclosed herein.

FIG. 4 is a flow chart (S400) illustrating a method, implemented by the UE, for coordinated switching gap operations in the wireless network (1000), according to an embodiment as disclosed herein; The operations (S402-S414) are performed by the coordinated switching gap controller (140).

At S402, the method includes sending the switching gap configuration request to the first network operator apparatus (200*a*) associated with the first SIM of the plurality of SIMs (150) of the UE (100). At S404, the method includes receiving the switching gap configuration from the first network operator apparatus (200*a*). The switching gap configuration includes the switching gap start and stop time, the switching gap duration, and the number of repetitions of the switching gap. At S406, the method includes detecting that the BSR triggering, grant for uplink transmission, and measurement report and CSI reporting time for the first network operator apparatus (200*a*) lies in between one of the switching gap start and stop time, the switching gap duration, and the number of repetitions of the switching gap.

At S408, the method includes preventing the triggering of the BSR to the first network operator apparatus (200*a*). At S410, the method includes reporting the new BSR report to the first network operator apparatus (200*a*) to indicate no buffered data. At S412, the method includes processing the grant for which the corresponding uplink transmission is pursued before start of the switching gap and discarding the grants for which the uplink transmission falls in the between the switching gap. At S414, the method includes abandoning or discarding at least one of the measurement report or the CSI reporting from the UE (100).

The various actions, acts, blocks, steps, or the like in the flow chart (S400) may be performed in the order presented, in a different order or simultaneously. Further, in some embodiments, some of the actions, acts, blocks, steps, or the like may be omitted, added, modified, skipped, or the like without departing from the scope of the invention.

Figure 5:
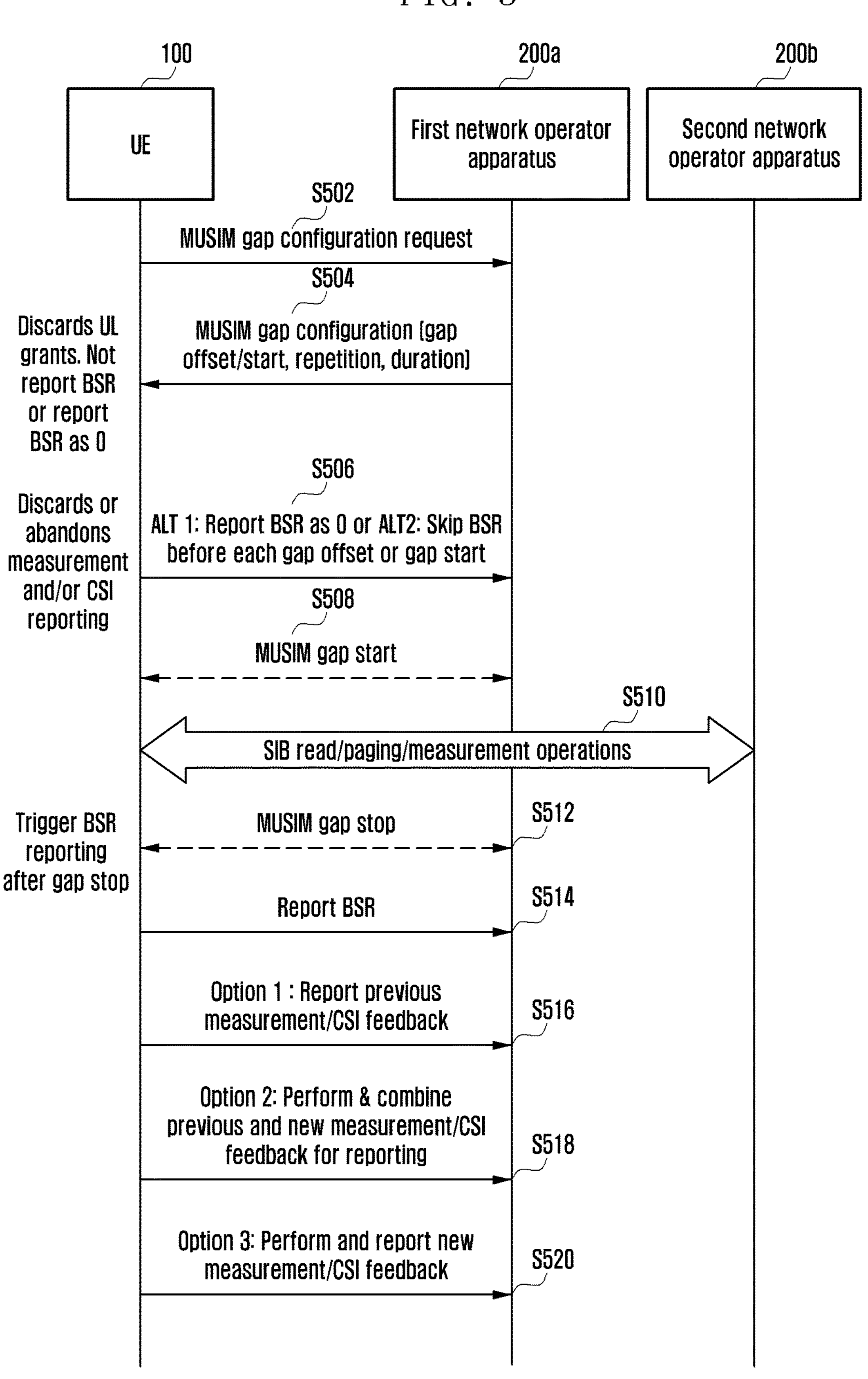
FIG. 5 is a sequence flow diagram illustrating the coordinated switching gap operations by the UE comprising the plurality of SIMs in the wireless network upon detecting a start or a stop of a switching gap, according to an embodiment as disclosed herein.

FIG. 5 is a sequence flow diagram illustrating the coordinated switching gap operations by the UE (100) comprising the plurality of SIMs (150) in the wireless network (1000) upon detecting the stop of the switching gap, according to an embodiment as disclosed herein.

Referring to the FIG. 5, at S502, the UE (100) sends the MUSIM gap configuration request to the first network operator apparatus (200*a*) associated with the first SIM (150*a*) of the plurality of SIMs (150) of the UE (100). At S504, the UE (100) receives the MUSIM gap configuration from the first network operator apparatus (200*a*). The MUSIM gap configuration includes the switching gap start and stop time (i.e., gap offset), the switching gap duration, and the number of repetitions of the switching gap. At S506, based on the MUSIM gap configuration, the UE (100) discards the UL grants and does not report the BSR or reports the BSR as 0. Further, UE (100) discards or abandons measurement and/or CSI reporting. The UE (100) skips the BSR before each gap offset or gap start. At S508, the MUSIM gap start is between the UE (100) and the first network operator apparatus (200*a*). At S510, the UE (100) performs the SIB read, paging and measurement operations from the second network operator apparatus (200*b*). At S512, a MUSIM gap stop is between the UE (100) and the first network operator apparatus (200*a*). At S514, the UE (100) triggers the BSR reporting after gap stop. At S516, the UE (100) reports the previous measurement/CSI feedback to the first network operator apparatus (200*a*). At S518, the UE (100) performs and combines previous and new measurement/CSI feedback for reporting to the first network operator apparatus (200*a*). At S520, the UE (100) perform and reports new measurement/CSI feedback to the first network operator apparatus (200*a*).

Figure 6:
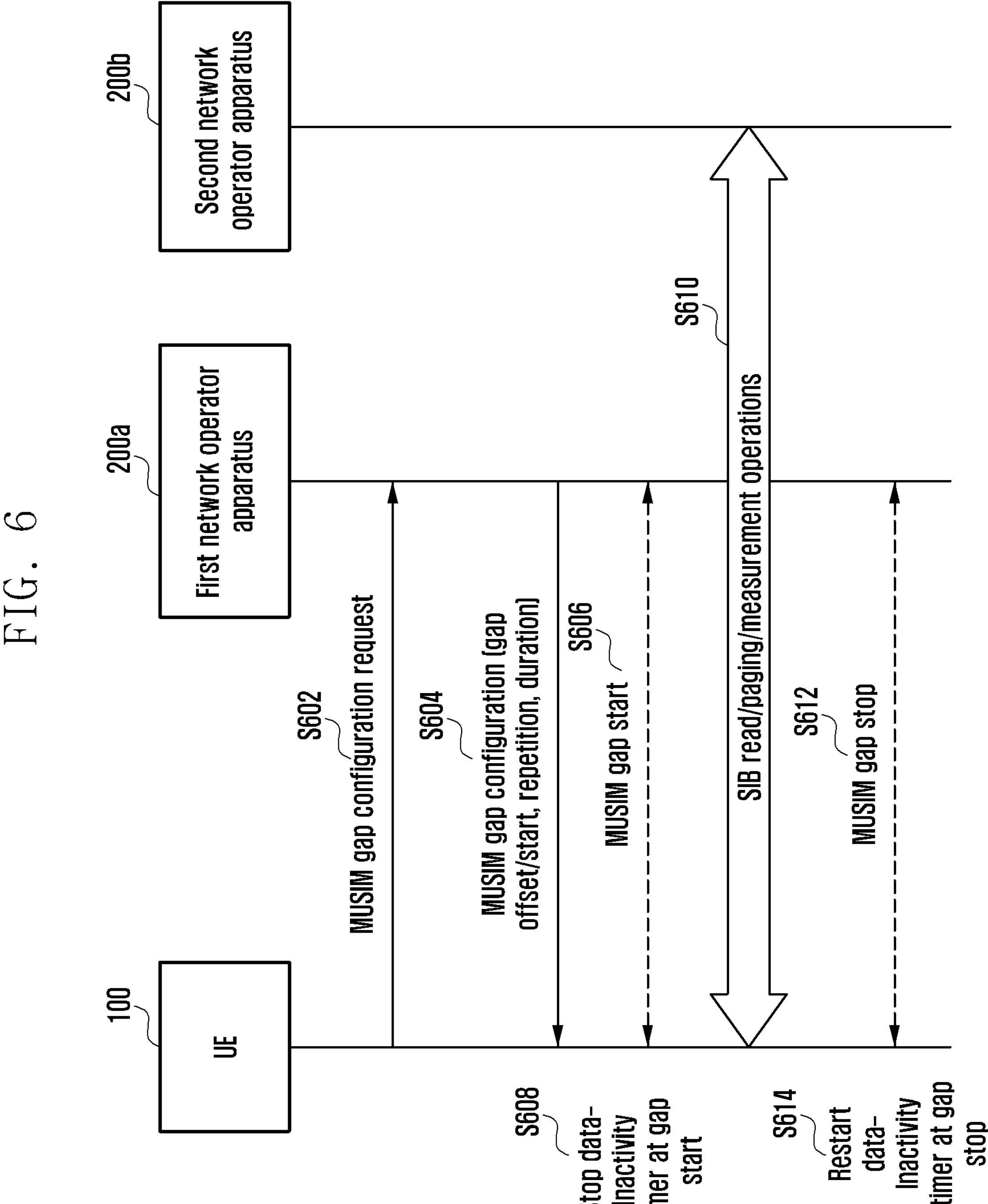
FIG. 6 is a sequence flow diagram illustrating the coordinated switching gap operations by the UE comprising the plurality of SIMs in the wireless network based on a data-inactivity timer, according to an embodiment as disclosed herein.

FIG. 6 is a sequence flow diagram illustrating the coordinated switching gap operations by the UE (100) comprising the plurality of SIMs (150) in the wireless network (1000) based on the data-Inactivity timer, according to an embodiment as disclosed herein.

Referring to the FIG. 6, At S602, the UE (100) sends the MUSIM gap configuration request to the first network operator apparatus (200*a*) associated with the first SIM (150*a*) of the plurality of SIMs (150) of the UE (100). At S604, the UE (100) receives the MUSIM gap configuration from the first network operator apparatus (200*a*). The MUSIM gap configuration includes the switching gap start and stop time (i.e., gap offset), the switching gap duration, and the number of repetitions of the switching gap. At S606, the MUSIM gap start is between the UE (100) and the first network operator apparatus (200*a*). At S608, the UE (100) stops the data-Inactivity timer at the gap start. At S610, the UE (100) performs the SIB read, paging and measurement operations from the second network operator apparatus (200*b*). At S612, a MUSIM gap stop is between the UE (100) and the first network operator apparatus (200*a*). At S614, the UE (100) restarts the data-Inactivity timer at the gap stop.

Figure 7:
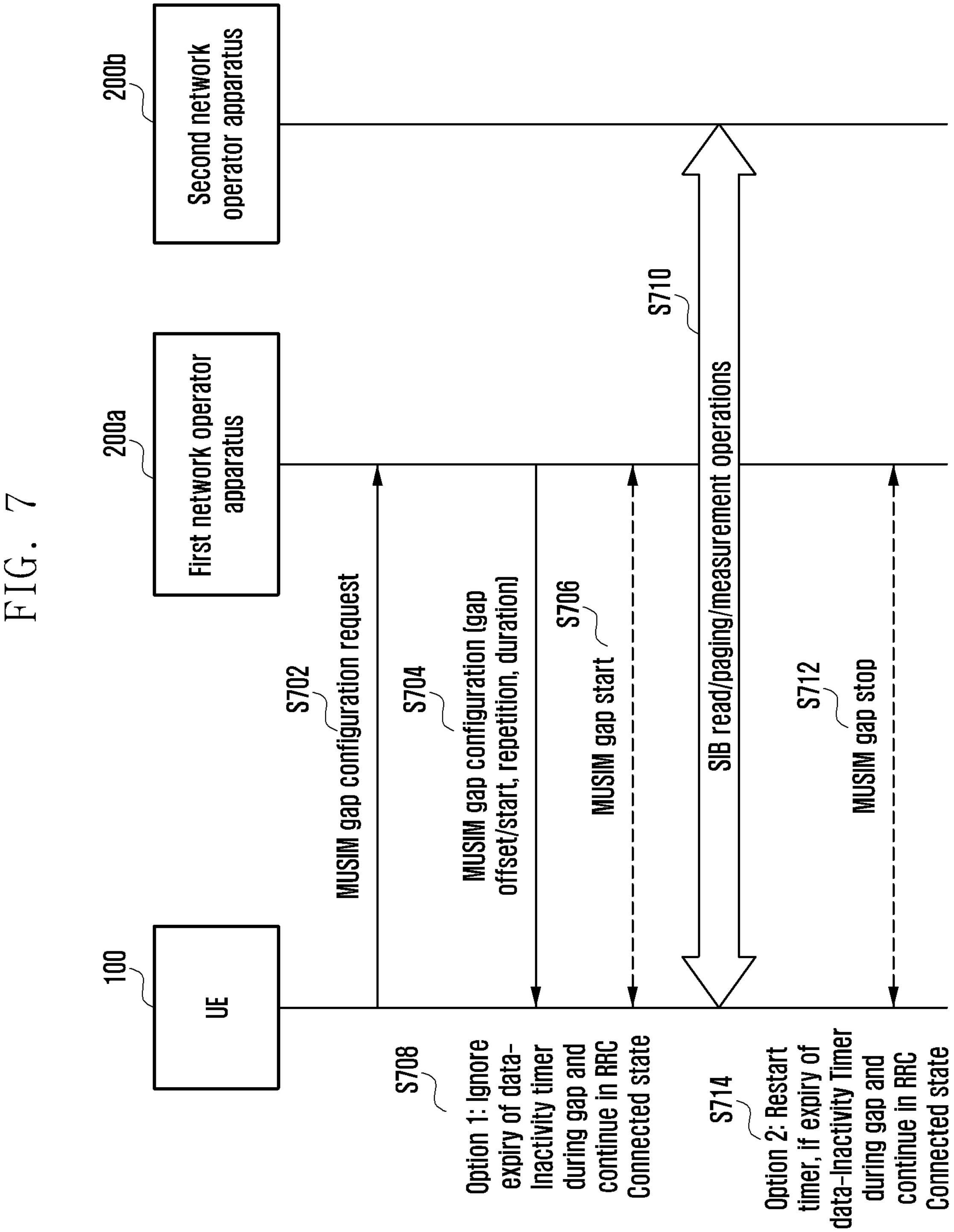
FIG. 7 is another sequence flow diagram illustrating the coordinated switching gap operations by the UE comprising the plurality of SIMs in the wireless network based on the data-Inactivity timer, according to an embodiment as disclosed herein.

FIG. 7 is another sequence flow diagram illustrating the coordinated switching gap operations by the UE (100) comprising the plurality of SIMs (150) in the wireless network (1000) based on the data-Inactivity timer, according to an embodiment as disclosed herein.

Referring to the FIG. 7, at S702, the UE (100) sends the MUSIM gap configuration request to the first network operator apparatus (200*a*) associated with the first SIM (150*a*) of the plurality of SIMs (150) of the UE (100). At S704, the UE (100) receives the MUSIM gap configuration from the first network operator apparatus (200*a*). The MUSIM gap configuration includes the switching gap start and stop time (i.e., gap offset), the switching gap duration, and the number of repetitions of the switching gap. At S708, the MUSIM gap start is between the UE (100) and the first network operator apparatus (200*a*). At S708, the UE (100) ignores the expiry of data-Inactivity timer during the gap start and continue in the RRC connected state.

At S710, the UE (100) performs the SIB read, paging and measurement operations from the second network operator apparatus (200*b*). At S712, a MUSIM gap stop is between the UE (100) and the first network operator apparatus (200*a*). At S714, the UE (100) restarts the data-Inactivity timer at the gap stop, if expiry of data-Inactivity Timer during gap and continue in the RRC Connected state.

Figure 8:
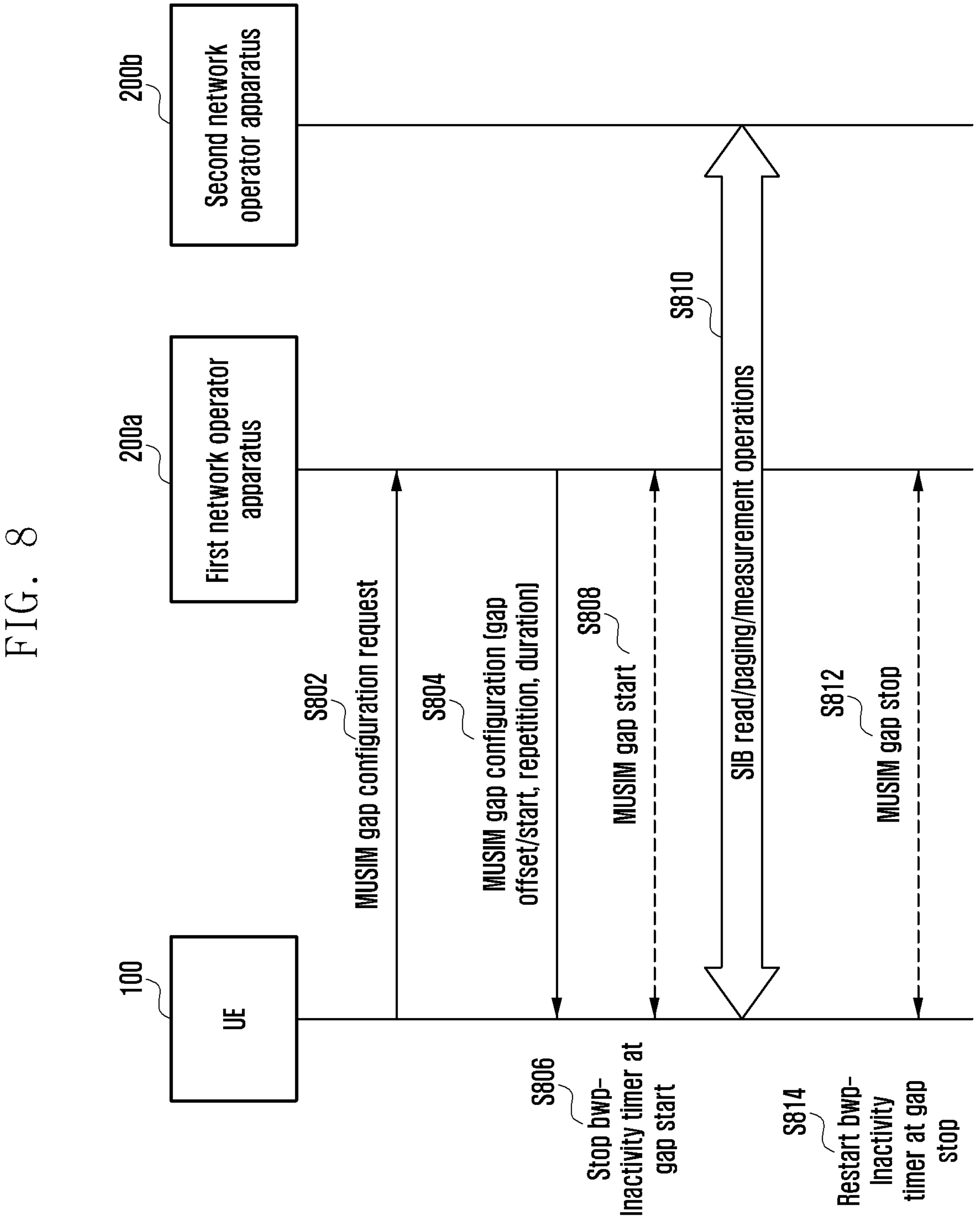
FIG. 8 is a sequence flow diagram illustrating the coordinated switching gap operations by the UE comprising the plurality of SIMs in the wireless network based on a bwp-inactivity timer, according to an embodiment as disclosed herein.

FIG. 8 is a sequence flow diagram illustrating the coordinated switching gap operations by the UE (100) comprising the plurality of SIMs (150) in the wireless network (1000) based on the bwp-Inactivity timer, according to an embodiment as disclosed herein.

Referring to the FIG. 8, at S802, the UE (100) sends the MUSIM gap configuration request to the first network operator apparatus (200*a*) associated with the first SIM (150*a*) of the plurality of SIMs (150) of the UE (100). At S804, the UE (100) receives the MUSIM gap configuration from the first network operator apparatus (200*a*). The MUSIM gap configuration includes the switching gap start and stop time (i.e., gap offset), the switching gap duration, and the number of repetitions of the switching gap.

At S806, the MUSIM gap start is between the UE (100) and the first network operator apparatus (200*a*). At S808, the UE (100) stops the bwp-Inactivity timer at the gap start. At S810, the UE (100) performs the SIB read, paging and measurement operations from the second network operator apparatus (200*b*). At S812, a MUSIM gap stop is between the UE (100) and the first network operator apparatus (200*a*). At S814, the UE (100) restarts the bwp-Inactivity timer at the gap stop.

FIG. 9 is another sequence flow diagram illustrating the coordinated switching gap operations by the UE (100) comprising the plurality of SIMs (150) in the wireless network (1000) based on the bwp-Inactivity timer, according to an embodiment as disclosed herein.

Referring to the FIG. 9, At S902, the UE (100) sends the MUSIM gap configuration request to the first network operator apparatus (200*a*) associated with the first SIM (150*a*) of the plurality of SIMs (150) of the UE (100). At S904, the UE (100) receives the MUSIM gap configuration from the first network operator apparatus (200*a*). The MUSIM gap configuration includes the switching gap start and stop time (i.e., gap offset), the switching gap duration, and the number of repetitions of the switching gap. At S906, the MUSIM gap start is between the UE (100) and the first network operator apparatus (200*a*). At S808, the UE (100) ignores the expiry of bwp-inactivity timer during the gap start and continues in same BWP.

At S910, the UE (100) performs the SIB read, paging and measurement operations from the second network operator apparatus (200*b*). At S912, a MUSIM gap stop is between the UE (100) and the first network operator apparatus (200*a*). At S914, the UE (100) restarts timer, if expiry of BWP-inactivity timer during gap and continue in same BWP.

Figure 10:
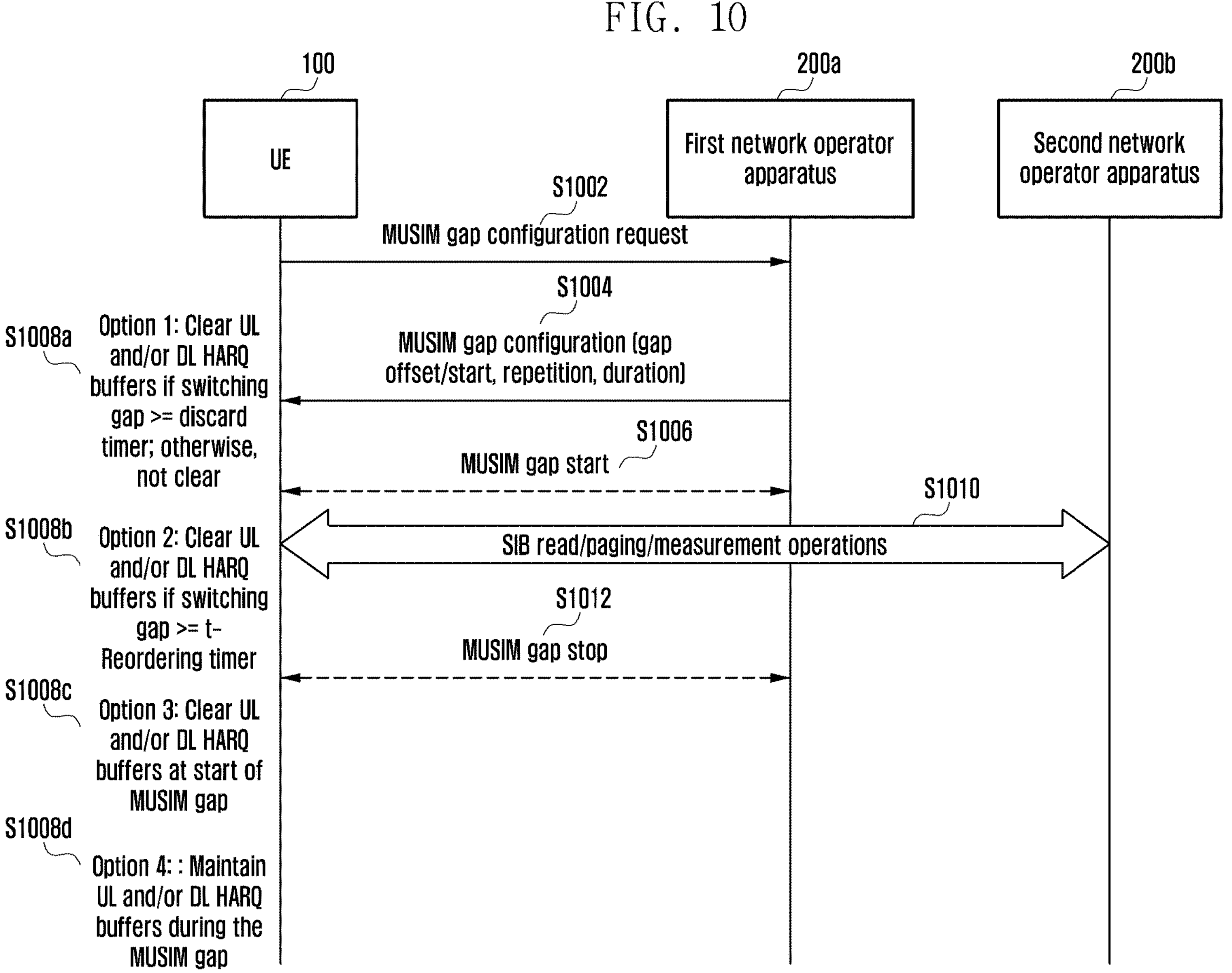
FIG. 10 is a sequence flow diagram illustrating the coordinated switching gap operations for handling UL and/or DL HARQ buffers, according to an embodiment as disclosed herein.

FIG. 10 is a sequence flow diagram illustrating the coordinated switching gap operations for handling UL and/or DL HARQ buffers, according to an embodiment as disclosed herein.

Referring to the FIG. 10, at S1002, the UE (100) sends the MUSIM gap configuration request to the first network operator apparatus (200*a*) associated with the first SIM (150*a*) of the plurality of SIMs (150) of the UE (100). At S1004, the UE (100) receives the MUSIM gap configuration from the first network operator apparatus (200*a*). The MUSIM gap configuration includes the switching gap start and stop time (i.e., gap offset), the switching gap duration, and the number of repetitions of the switching gap. At S1006, the MUSIM gap start is between the UE (100) and the first network operator apparatus (200*a*). At S1008*a*, the UE (100) clears the UL and/or DL HARQ buffers if switching gap>=discard timer, otherwise, not clear.

At S1008*b*, the UE (100) clears the UL and/or DL HARQ buffers if switching gap>=t-Reordering timer. At S1008*c*, the UE (100) clears the UL and/or DL HARQ buffers at start of the MUSIM gap. At S1008*d*, the UE (100) maintains UL and/or DL HARQ buffers during the MUSIM gap. At S1010, the UE (100) performs the SIB read, paging and measurement operations from the second network operator apparatus (200*b*). At S1012, a MUSIM gap stop is between the UE (100) and the first network operator apparatus (200*a*).

Figure 11:
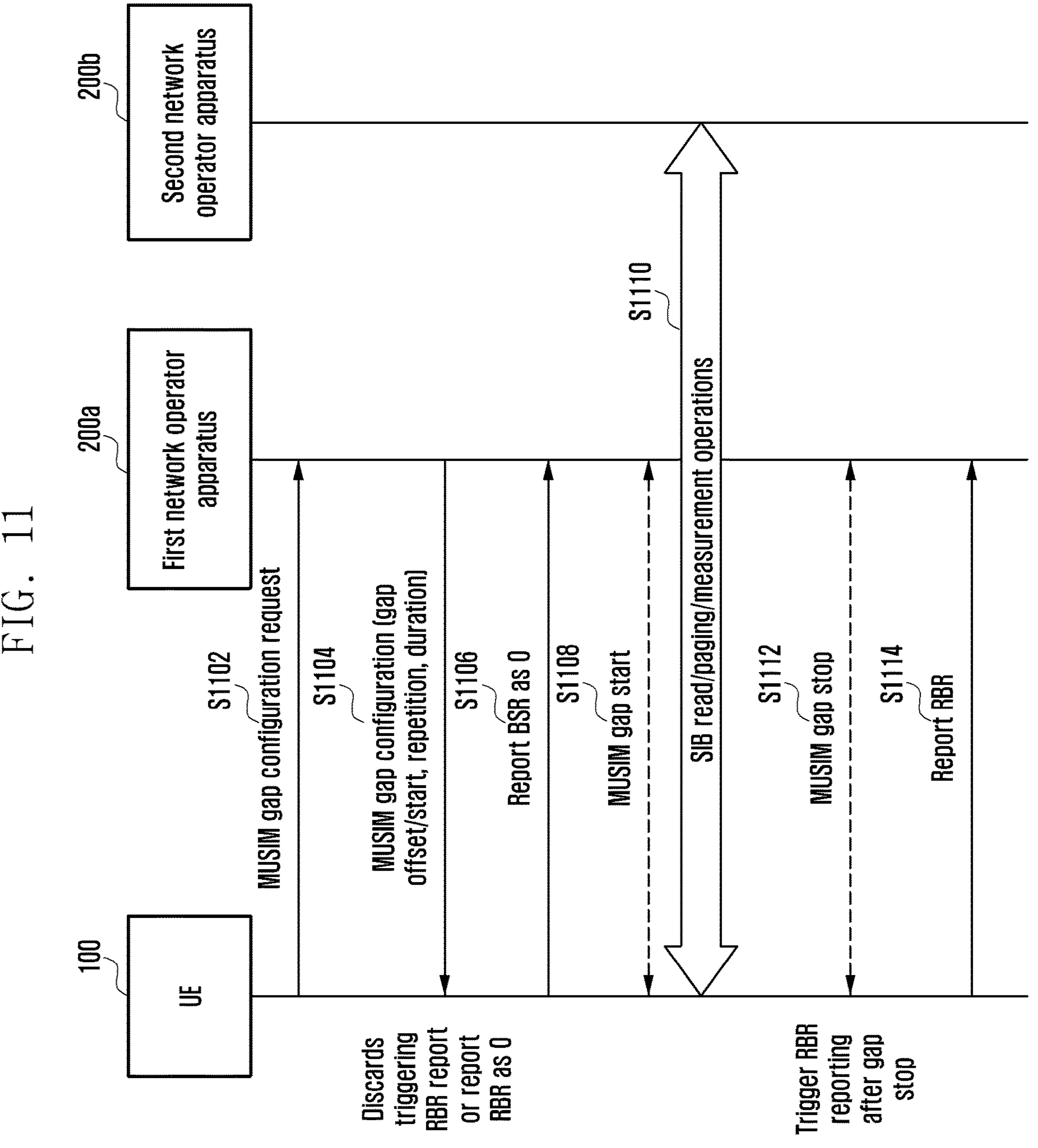
FIG. 11 is a sequence flow diagram illustrating the coordinated switching gap operations for handling a RBR report, according to an embodiment as disclosed herein.

FIG. 11 is a sequence flow diagram illustrating the coordinated switching gap operations for handling the RBR report, according to an embodiment as disclosed herein.

Referring to the FIG. 11, At S1102, the UE (100) sends the MUSIM gap configuration request to the first network operator apparatus (200*a*) associated with the first SIM (150*a*) of the plurality of SIMs (150) of the UE (100). At S1104, the UE (100) receives the MUSIM gap configuration from the first network operator apparatus (200*a*). The MUSIM gap configuration includes the switching gap start and stop time (i.e., gap offset), the switching gap duration, and the number of repetitions of the switching gap.

At S1106, based on the MUSIM gap configuration, the UE (100) discards triggering RBR report or reports the BSR as 0. At S1108, the MUSIM gap start is between the UE (100) and the first network operator apparatus (200*a*). At S1110, the UE (100) performs the SIB read, paging and measurement operations from the second network operator apparatus (200*b*). At S1112, a MUSIM gap stop is between the UE (100) and the first network operator apparatus (200*a*). At S1114, the UE (100) triggers the BSR reporting after gap stop.

FIG. 12 is a sequence flow diagram illustrating the coordinated switching gap operations by the UE (100) upon the UE (100) sending the MUSIM gap configuration request for switching gap or a RRC release to the first network apparatus (200*a*), according to an embodiment as disclosed herein.

Referring to the FIG. 12, At S1202, the RRC connection establishment is between the UE (100) and the first network operator apparatus (200*a*). At S1204, the UE (100) sends the MUSIM gap configuration request for the switching gap or the RRC release (preferred RRC state) to the first network operator apparatus (200*a*).

At S1206*a*, the UE (100) determines need for the switching gap or the RRC release based on MUSIM operation type. At S1206*b*, the UE (100) determines the need for switching gap or the RRC release based on the pre-configured or specified gap threshold duration. At S1206*c*, the UE (100) determines the need for switching gap if gap duration<data-Inactivity Timer duration or RRC Release if gap duration is >=data-Inactivity timer duration.

At S1208, the first network operator apparatus (200*a*) sends the MUSIM gap configuration or the RRC release or the RRC release with suspend configuration to the UE (100). At S1210 the RRC connection establishment is between the UE (100) and the second network operator apparatus (200*b*).

FIG. 13 is a sequence flow diagram illustrating the coordinated switching gap operations upon the UE (100) receiving the configuration for MUSIM response timer from the first network apparatus (200*a*), according to an embodiment as disclosed herein.

Referring to the FIG. 13, At S1302, the RRC connection establishment is between the UE (100) and the first network operator apparatus (200*a*). At S1304, the UE (100) determines the need for the RRC release for the MUSIM operation. At S1306, the first network operator apparatus (200*a*) sends the configuration for the MUSIM response timer to the UE (100). At S1308, the UE (100) sends the MUSIM gap configuration request for RRC Release (or preferred RRC state) to the first network operator apparatus (200*a*).

At S1310, the UE (100) does not receive the RRC release or RRC release with suspend configuration from the first network operator apparatus (200*a*). At S1312, on expiry of the MUSIM Response Timer, the UE (100) locally releases RRC connection and transits to one of the idle state or the inactive state. At S1314, the RRC connection establishment is between the UE (100) and the second network operator apparatus (200*b*).

FIG. 14 is a sequence flow diagram illustrating the coordinated switching gap operations by the UE (100) for handling the SR/RACH transmission in the wireless network (100), according to an embodiment as disclosed herein.

Referring to the FIG. 14, At S1402, the UE (100) sends the MUSIM gap configuration request to the first network operator apparatus (200*a*) associated with the first SIM (150*a*) of the plurality of SIMs (150) of the UE (100). At S1404, the UE (100) receives the MUSIM gap configuration from the first network operator apparatus (200*a*). The MUSIM gap configuration includes the switching gap start and stop time (i.e., gap offset), the switching gap duration, and the number of repetitions of the switching gap. At S1406, the MUSIM gap start is between the UE (100) and the first network operator apparatus (200*a*).

At S1408, the UE (100) performs the SIB read, paging and measurement operations from the second network operator apparatus (200*b*). At S1410, the UE (100) resumes early if the MUSIM task is completed earlier than the MUSIM gap duration and the sends SR/RACH to the first network operator apparatus (200*a*). At S1412, a MUSIM gap stop is between the UE (100) and the first network operator apparatus (200*a*). Further, the UE (100) resumes only after gap duration even if the MUSIM task is completed earlier than MUSIM gap duration. At S1412, the UE (100) performs the normal Resume and sends the SR/RACH to the First network operator apparatus 200*a*.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

The invention claimed is:

1. A method performed by a user equipment (UE) comprising a multiple universal subscriber identity module (MUSIM) in a wireless communication system, the method comprising:

initiating transmission of a UE assistance information message including a preference to leave a radio resource control (RRC) connected state of a first network associated with a first universal subscriber identity module (USIM), wherein the preference indicates an RRC idle state or an RRC inactive state;

starting a timer after initiating transmission of the UE assistance information message including the preference to leave the RRC connected state of the first network; and upon an expiry of the timer, entering the RRC idle state or the RRC inactive state of the first network.

2. The method of claim 1, further comprising:

releasing an RRC connection of the first network.

3. The method of claim 2, further comprising:

establishing an RRC connection with a second network.

4. The method of claim 1, further comprising:

transmitting, to a first base station associated with the first network, a MUSIM gap configuration request for switching gap via an RRC signaling message; and receiving, from the first base station, an RRC reconfiguration message including MUSIM gap configuration information, wherein the MUSIM gap configuration information includes at least one of a MUSIM gap offset, a switching gap duration, or a number of repetitions of the switching gap.

5. A method performed by a base station of a first network associated with a first universal subscriber identity module (USIM) of a multiple USIM (MUSIM) of a user equipment (UE) in a wireless communication system, the method comprising:

receiving, from the UE, a UE assistance information message including a preference to leave a radio resource control (RRC) connected state of the first network associated with the first USIM, wherein the preference indicates an RRC idle state or an RRC inactive state; and transmitting, to the UE, an RRC release message, wherein, upon an expiry of a timer, started after initiating transmission of the UE assistance information message including the preference to leave the RRC connected state of the first network, the UE enters to the RRC idle state or the RRC inactive state of the first network.

6. The method of claim 5, wherein an RRC connection with a second network and the UE is established.

7. The method of claim 5, wherein an RRC connection of the first network is released.

8. The method of claim 5, further comprising:

receiving, from the UE, a MUSIM gap configuration request for switching gap via an RRC signaling message; and transmitting, to the UE, an RRC reconfiguration message including MUSIM gap configuration information, wherein the MUSIM gap configuration information comprises at least one of a MUSIM gap offset, a switching gap duration, or a number of repetitions of the switching gap.

9. A user equipment (UE) comprising a multiple universal subscriber identity module (MUSIM) in a wireless communication system, the UE comprising:

a transceiver; and a controller coupled with the transceiver and configured to:

initiate transmission of a UE assistance information message including a preference to leave a radio resource control (RRC) connected state of a first network associated with a first universal subscriber identity module (USIM), wherein the preference indicates an RRC idle state or an RRC inactive state, start a timer after initiating transmission of the UE assistance information message including the preference to leave the RRC connected state of the first network, and upon an expiry of the timer, enter the RRC idle state or the RRC inactive state of the first network.

10. The UE of claim 9, wherein the controller is further configured to:

establish an RRC connection with a second network.

11. The UE of claim 9, wherein the controller is further configured to:

release an RRC connection of the first network.

12. The UE of claim 9, wherein the controller is further configured to:

transmit, to a first base station associated with the first network, a MUSIM gap configuration request for switching gap via an RRC signaling message, and receive, from the first base station, an RRC reconfiguration message including MUSIM gap configuration information, wherein the MUSIM gap configuration information comprises at least one of a MUSIM gap offset, switching gap duration, or a number of repetitions of the switching gap.

13. A base station of a first network associated with a first universal subscriber identity module (USIM) of a multiple USIM (MUSIM) of a user equipment (UE) in a wireless communication system, the base station comprising:

a transceiver; and a controller coupled with the transceiver and configured to:

receive, from the UE, a UE assistance information message including a preference to leave a radio resource control (RRC) connected state of the first network associated with the first USIM, wherein the preference indicates an RRC idle state or an RRC inactive state, and transmit, to the UE, an RRC release message, wherein, upon an expiry of a timer, started after initiating transmission of the UE assistance information message including the preference to leave the RRC connected state of the first network, the UE enters to the RRC idle state or the RRC inactive state of the first network.

14. The base station of claim 13, wherein an RRC connection with a second network and the UE is established.

15. The base station of claim 13, wherein an RRC connection of the first network is released.

16. The base station of claim 13, wherein the controller is further configured to:

receive, from the UE, a MUSIM gap configuration request for switching gap via an RRC signaling message; and transmit, to the UE, an RRC reconfiguration message including MUSIM gap configuration information, wherein the MUSIM gap configuration information comprises at least one of a MUSIM gap offset, a switching gap duration, or a number of repetitions of the switching gap.

* * * * *